(12) United States Patent
McGregor et al.

(10) Patent No.: US 6,347,499 B1
(45) Date of Patent: *Feb. 19, 2002

(54) BAG SEALING MECHANISM

(76) Inventors: James McGregor, 23175 France Cir., Lakeville, MN (US) 55044; Tracy Steiger, 1605 Mosher Ave., Owatonna, MN (US) 55060; LaVerne Wobschall, 2580 Lamada Pl., Owatonna, MN (US) 55060; Scott Mitchell Anderson, 1 35 16th St. SW.; Keith Kruckeberg, 3 O Arglen Dr., both of Owatonna, MN (US) 55060

( * ) Notice: Subject to any disclaimer, the term of this patent is extended or adjusted under 35 U.S.C. 154(b) by 0 days.

This patent is subject to a terminal disclaimer.

(21) Appl. No.: 09/409,099

(22) Filed: Sep. 30, 1999

Related U.S. Application Data

(63) Continuation-in-part of application No. 09/251,603, filed on Feb. 17, 1999.

(51) Int. Cl.[7] .............................................. B65B 51/14
(52) U.S. Cl. ..................................... 53/374.9; 53/375.2
(58) Field of Search ............................... 53/571, 284.7, 53/374.3, 374.5, 374.6, 374.7, 374.9, 375.2

(56) References Cited

U.S. PATENT DOCUMENTS

| | | | | |
|---|---|---|---|---|
| 2,310,382 A | * | 2/1943 | Allen ........................ | 53/482 |
| 2,608,333 A | * | 8/1952 | Marziani .................... | 53/374.9 |
| 2,732,988 A | * | 1/1956 | Feinstein .................... | 53/374.9 |
| 2,987,858 A | * | 6/1961 | Kerker ....................... | 53/375.2 |
| 3,063,890 A | * | 11/1962 | Saumsiegle ................ | 53/374.9 |
| 3,488,915 A | * | 1/1970 | Delestatius ................ | 53/284.7 |
| 3,889,449 A | | 6/1975 | Membrino | |
| 4,019,305 A | * | 4/1977 | McGhie ..................... | 53/375.2 |
| 4,322,932 A | | 4/1982 | McGregor | |
| 4,432,186 A | | 2/1984 | McGregor | |
| 4,526,214 A | | 7/1985 | McGregor | |
| 4,612,965 A | | 9/1986 | McGregor | |
| 4,884,389 A | | 12/1989 | McGregor | |
| 5,109,894 A | | 5/1992 | McGregor | |
| 5,349,996 A | | 9/1994 | McGregor | |
| 5,535,792 A | | 7/1996 | McGregor | |
| 5,768,863 A | | 6/1998 | McGregor | |
| 5,771,667 A | | 6/1998 | McGregor | |

* cited by examiner

*Primary Examiner*—John Sipos
(74) *Attorney, Agent, or Firm*—Moore & Hansen

(57) ABSTRACT

An integrated and compact bag filling machine comprising a material dispensing spout, a slip tube suspended in substantially vertical alignment with the spout, and a bag sealing apparatus comprising a pair of opposable forming bars and a pair of independently actuable and opposable sealing bars is herein disclosed. The bag filling machine is capable of bottom filling and sealing both paper and plastic bags having gusseted or flat sides with little or no modification.

13 Claims, 13 Drawing Sheets

BAG SEALING MECHANISM

This application is a Continuation in Part of U.S. patent application Ser. No. 09/251,603, filed Feb. 17, 1999, commonly assigned herewith.

BACKGROUND OF THE INVENTION

This invention relates to fully automated bag handling and filling machines which pick up bags one at a time from a supply source, fill the bags, and release them in an integrated, high speed, and efficient system. More particularly, this invention is drawn to an apparatus for bottom filling bags used in combination with a bag sealing apparatus that is capable of closing and handling both paper and plastic type bags within a fully automated bag handling and filling machine.

Automated bag handling and filling machines are known in the art. See, for example, U.S. Pat. Nos. 4,322,932, 4,432,186, and 4,612,965 issued to Harold R. McGregor. Traditionally, bag handling and filling machines have utilized bag holding clamps on a clam shell type of filling spout to hold the bag during a filling operation on the spout, with the filled bag then being conveyed to a separate, closing machine for closing the bag top, as by stitching or by heat sealing. Bag control and forming bars have been incorporated to grip the bag mouth, after filling, and to lower it onto a conveyor, which serves to transport the filled to a separate, bag closing station. Such bag handling and control bars are shown, for example, in U.S. Pat. No. 4,322,932. Recognizing that operating efficiencies including more compact machine footprints and reduced operational costs could be realized by incorporating the bag sealing function within a single machine for handling, filling, and sealing bags, such integrated machines have been developed. For an example of such an integrated machine see U.S. Pat. No. 5,771,667 issued to Harold R. McGregor.

However, bag sealing apparatuses for such integrated bag handling and filling machines have been limited in the manner in which bags could be filled and to closing only plastic bags. Consequently, a bottom filling apparatus for filling bags from the bottom up and a bag sealing apparatus capable of handling and closing both plastic bags and paper bags have been developed.

OBJECTS OF THE INVENTION

A first objective of this invention is to provide a filling mechanism that allows a bag to be filled from the bottom up. Another objective of this invention is to provide a bag sealing apparatus which is capable of handling and closing both plastic and paper bags. Yet another objective of this invention is to provide an integrated bag filling machine which is capable of both filling, sealing, and handling bags and which occupies a minimum of space on a factory floor. A further objective of this invention is to provide a bag closing apparatus capable of handling and closing both plastic and paper bags and which may be mounted in a number of ways, including on a vertically moveable carriage or from an overhead support structure.

BRIEF SUMMARY OF THE INVENTION

The present invention overcomes the problems of the prior art by utilizing a tube-type of bottom filling device in combination with a bag sealing apparatus locate within the same lateral confines as the filling device and bag hanging spout. The bag sealing apparatus is mounted on a vertically moveable carriage positioned in substantial vertical alignment with the filling device. The tube-type of bag filling device may comprise either a slip tube or a vertical auger contained within a fill tube.

The bag sealing apparatus of the present invention comprises a pair of opposable forming bars and a pair of independently actuable and opposable sealing bars which are disposed between a pair of parallel mounting plates in such a manner that the forming bars clamp the top of a filled bag below said sealing bars.

The forming bars are essentially an apparatus for clamping and holding a bag that is to be sealed. In order improve the grasping capabilities of the forming bars, the respective bars may be provided with complementary contoured faces that are arranged and constructed to securely clamp the top of a filled bag therebetween. One such face structure includes arranging the complementary contoured faces of the clamping or forming bars in a tongue-in-groove pattern. Furthermore, in order to ensure the secure clamping of a bag between the forming bars of the present invention, the forming bars are constrained to pivot between the mounting plates in symmetrical opposition with one another.

To close and seal the tops of paper bags, a first of the sealing bars of the bag sealing apparatus may include a bag folding arm for folding a bag top over into contact with a side of the bag being sealed. The bag folding arm or fold-over arm is pivotally mounted to one of the sealing bars. The fold over arm works in conjunction with a bag crimping structure arranged and constructed to form a crimp in the top of said filled bag so as to bias the top of said filled bag in a desired fold direction. The bag crimping structure of the bag sealing apparatus comprises respective forming surfaces formed in the opposable faces of the sealing bars. The forming surfaces of the sealing bars are arranged to clamp a bag top therebetween and form a crimp in the bag top to bias the top of the bag in a desired fold direction.

In addition, one of the sealing bars has secured thereto a backing mechanism which may be a simple plate arranged to oppose the compressive forces exerted by the fold-over arm mounted on the sealing bar. The compressive forces exerted between the compression plate of the backing mechanism and the fold over arm folds the top of a bag over into contact with the side of the bag and permits the heat sensitive adhesive to seal the bag top closed. One embodiment of the backing mechanism comprises a plurality of compression rollers arranged to be reciprocated laterally with respect to the fold over arm when the fold over arm has been actuated to fold the bag top over into contact with the bag side.

It may also be desirable to provide a heating element on the forming surfaces of the sealing bars to heat the bag top at the point of contact between the forming surfaces and the bag top. This application of heat to the bag top is intended to seal a plastic bag or the plastic liner of a paper bag. In addition, the forming or clamping bars may be provided with heating elements that also allow the forming bars to seal a plastic bag or the plastic liner of a paper bag.

One manner of sealing a paper bag top closed is to utilize a heat sensitive adhesive. Therefore, a heating element is may be secured to one of the sealing bars so as to activate the heat sensitive adhesive applied to a bag side. The folding arm secured to one of the sealing bars may then fold the bag top into contact with the side wall of the bag so as to seal the bag top with the activated heat sensitive adhesive.

The bag sealing apparatus of the present invention is intended to be used in conjunction with a bag filling machine and therefore it is desirable that the mounting plates between which the sealing bars and the forming or clamping bars are disposed be vertically movable between a first, inoperative position, and a second, operative position in which the sealing bars and the forming or clamping bars may engage the top of a filled bag.

Alternatively, it is possible to alter the structure of the bag sealing apparatus so that it may be laterally moveable side-to-side or front-to-back between its first and second positions, as opposed to the preferred vertical movement.

The above described bag sealing apparatus is may be used in conjunction with a bag filling mechanism that comprises a material dispensing spout having clamping members thereon for maintaining a bag on the spout, and a slip tube suspended in substantially vertical alignment with the spout.

The material dispensing spout has a discharge end defined by closure members that are operable between closed and open positions for discharging particulate material into a bag and has a power actuator arranged to open and close the spout discharge end closure members. Clamping members on the spout discharge end are movable between a closed position in which the members are in clamping engagement with the mouth of a bag that is placed on the spout discharge end and an open position in which the members may release or receive a bag mouth from the spout discharge end. The slip tube is suspended in substantially vertical alignment with the spout and is vertically moveable between a first, bag filling position in which the slip tube extends through the spout discharge end and into a bag to be filled when the spout is open and a second, inoperative position in which the slip tube is retracted vertically and the spout is closed. The bag sealing apparatus described above is movable in a travel path between a first, bag receiving position in close proximity to the spout discharge end and a second, bag discharge position away from the spout.

It is specifically intended that the travel path of the bag sealing apparatus not be limited to vertical movement only, and may move from side-to-side or from front-to-back as indicated by the directional arrows in FIG. 11.

In order to facilitate the settling of the material with which a bag is filled, a nozzle may be provided within the slip tube. The nozzle is connected to a vacuum pump for evacuating air from the headspace of the bag being filled. The air in the headspace of the bag is preferably removed immediately prior to the closing of the material dispensing spout.

In the preferred embodiment of the present invention, the bag sealing mechanism is provided with a pair of sealing bars that are arranged and constructed to rotate between a first position in which these sealing bars are clear of the path of rotation of the crimping bars, and a second position in which the sealing bars engage the bag gripped by the forming bars to seal the inner liner of the bag.

The sealing bar mechanisms of the present invention comprise a sealing bar that is rotatively mounted upon a pair of U-shaped members or legs. Each of the U-shaped members upon is connected, as by bearings, between the legs of a respective forming bar assembly. A cam bearing projects inwardly from each of the U-shaped leg members to facilitate the rotation of the sealing bars between their first, inoperative positions and their second, operative positions. A pair of cam plates is mounted to the inner surface of the respective parallel side plates upon respective power cylinders. The power cylinders move the cam plates between first, lower positions and second, upper positions. The first and second positions of the cam plates correspond to the aforementioned first, inoperative position and second, inoperative position of the sealing bars themselves. To rotate the sealing bars, cam plates have formed therein cam follower slots which face outwardly toward the respective parallel side plates. The cam follower slots are arranged such that when the forming bars are rotated inwardly to grip and support a bag, the cam follower slots in each of the cam plates will receive the cam bearings of the U-shaped members adjacent to the parallel side plate to which the respective cam plates are mounted. When the cam plates are moved upwardly to their second position, the sealing bars are thereby caused to rotate to there second, operative position due the interaction of the cam bearings of the U-shaped members and the cam follower slots of the cam plates.

In order to seal a bag gripped by the forming bars of the present invention, one of the crimping bars is provided with a fold-over bar that is constructed and arranged to rotate between a first, upper position and a second, lower position. In its first, upper position, the fold-over bar is clear of the bag. As the fold-over bar rotates to its second, lower position, the fold-over bar folds a portion of the bag above the transverse crease formed by the crimping bars against a portion of the bag that is below the transverse crease. The fold-over arm achieves a mechanical advantage in the folding process by rotating between the first and second positions along a complex curvilinear path.

These and other objectives and advantages of the invention will appear more fully from the following description, made in conjunction with the accompanying drawings wherein like reference characters refer to the same or similar parts throughout the several views.

DETAILED DESCRIPTION OF THE INVENTION

Figure 1:
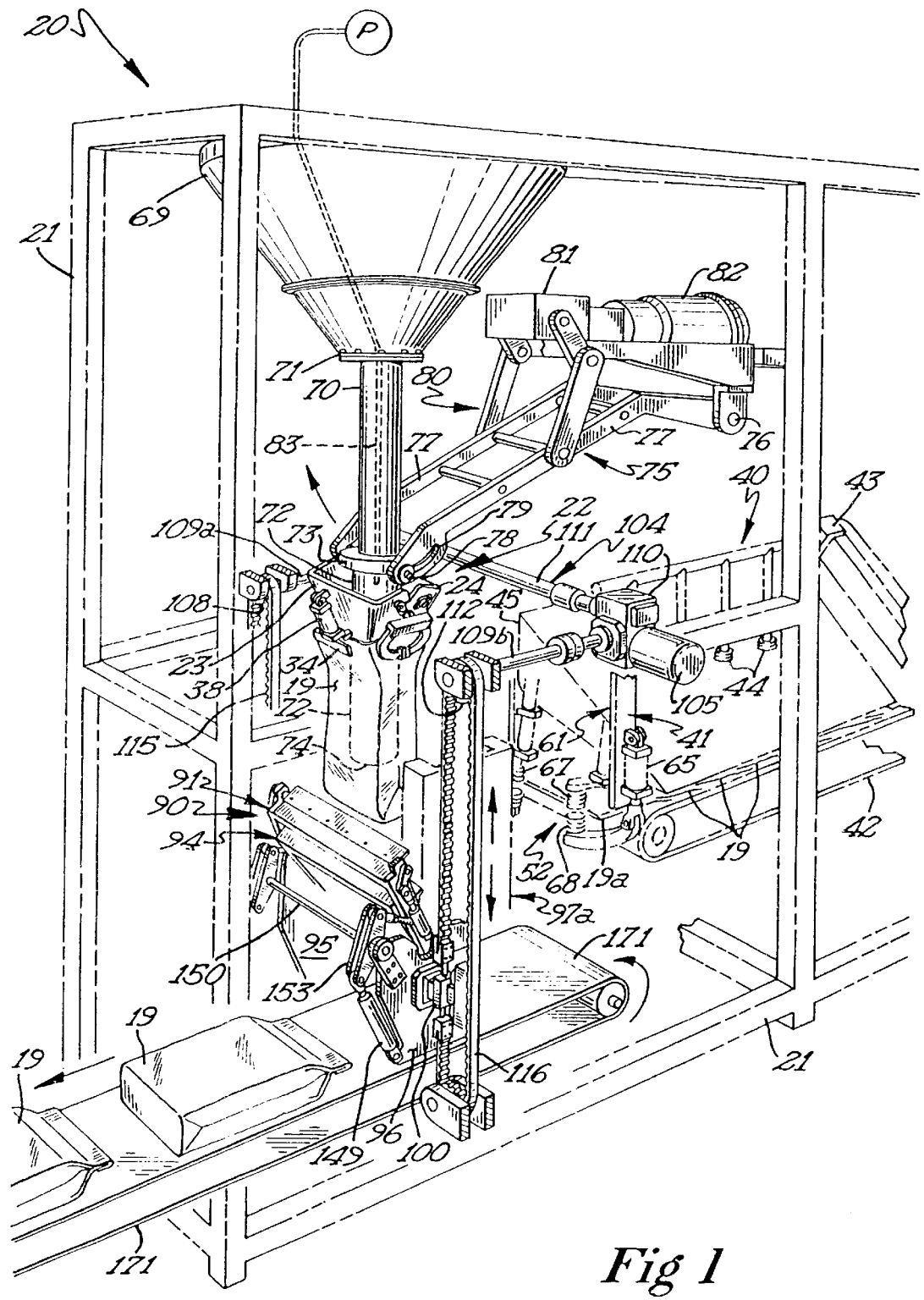
FIG. 1 is a perspective view of a compact bag filling machine according to the present invention.

FIG. 1 illustrates a machine incorporating an automatic bagging system having the fully controlled and coordinated bag handling, filling, and sealing components and features of this invention. The machine is generally indicated by reference numeral 20, and is mounted on a frame assembly which includes vertical and horizontal frame members and which is generally indicated in phantom lines at 21. It is to be understood that any frame assembly 21 capable of supporting the requisite parts of the present invention may be utilized.

FIG. 1 is a perspective view of the machine, which includes a material discharge spout 22. Spout 22 is preferably of the clam shell type, and is comprised of a pair of clam shell halves 23 and 24 which are pivotal between open and closed positions about pivot pin connections 25 and 26 at the lower, discharge end of spout 22. Examples of material discharge spouts 22 suitable for use within the bag filling machine 20 are given in U.S. Pat. Nos. 4,322,932 (Bag Filling and Handling Apparatus), 4,526,214 (Bag Filling Apparatus), 5,349,996 (Bag Filling Apparatus Having Dust-Tight Spout) and 5,771,667 (Bag Filling, Closing, and Sealing Machine), all of which were issued to Harold McGregor and are commonly assigned with the present application. The disclosures of U.S. Pat. Nos. 4,322,932, 4,526,214, 5,349,996 and 5,771,667 are hereby incorporated by reference. A suitable spout 22 is normally arranged to communicate with a material supply hopper 27 into which preapportioned charges of particulate material are dispensed, as by a net weight scale apparatus (not shown), for filling bags 19 one at a time with a desired quantity or weight of a material. The spout and apparatus as disclosed are designed to be utilized for filling bags of the open mouth type with free flowing, particulate material, including feed, seeds, etc. It is contemplated that various materials may be effectively dispensed into bags and sealed by the machine as disclosed herein, including material such as pet food and cereals.

Figure 2:
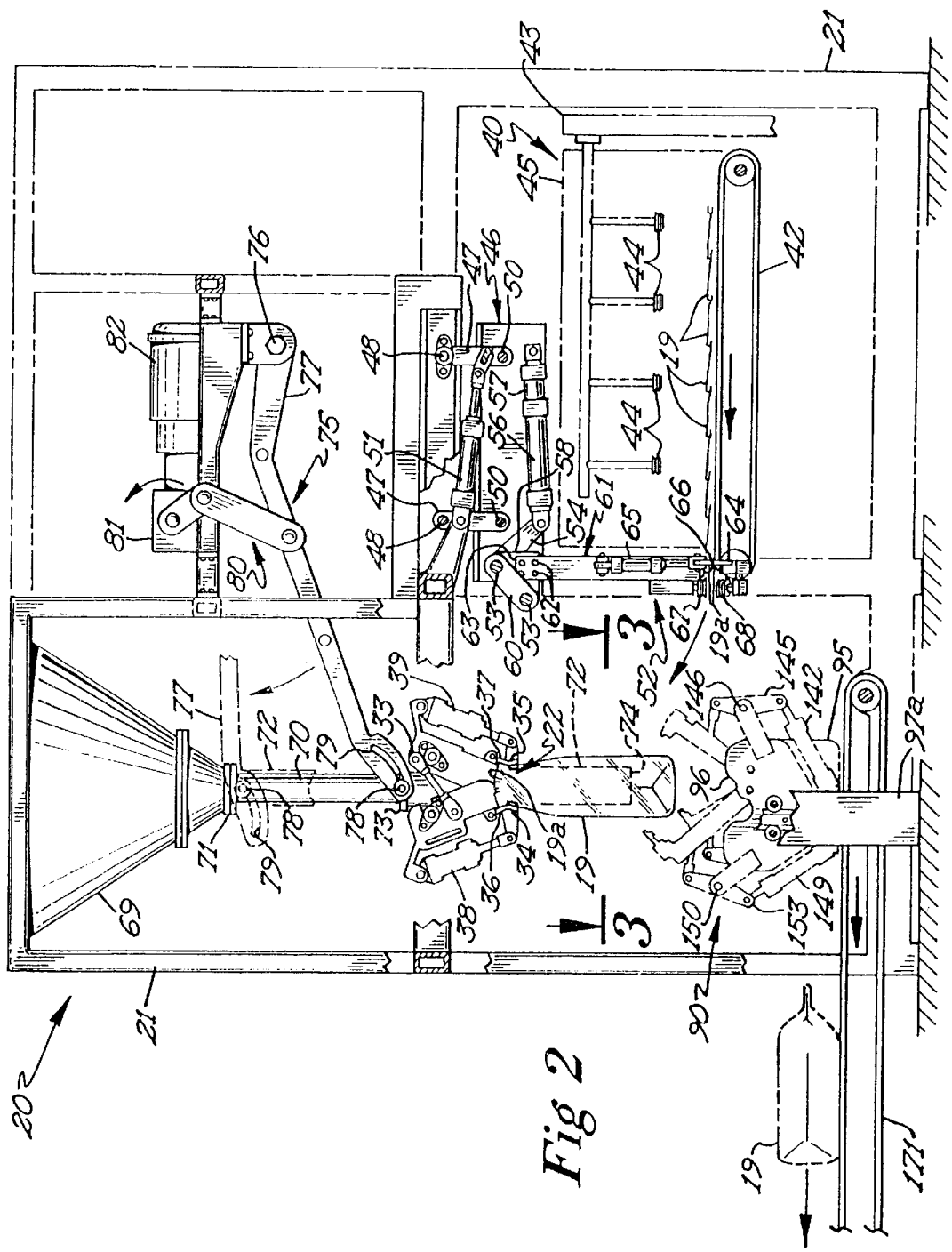
FIG. 2 is a side elevational view of the bag filling machine of FIG. 1.
Figure 4:
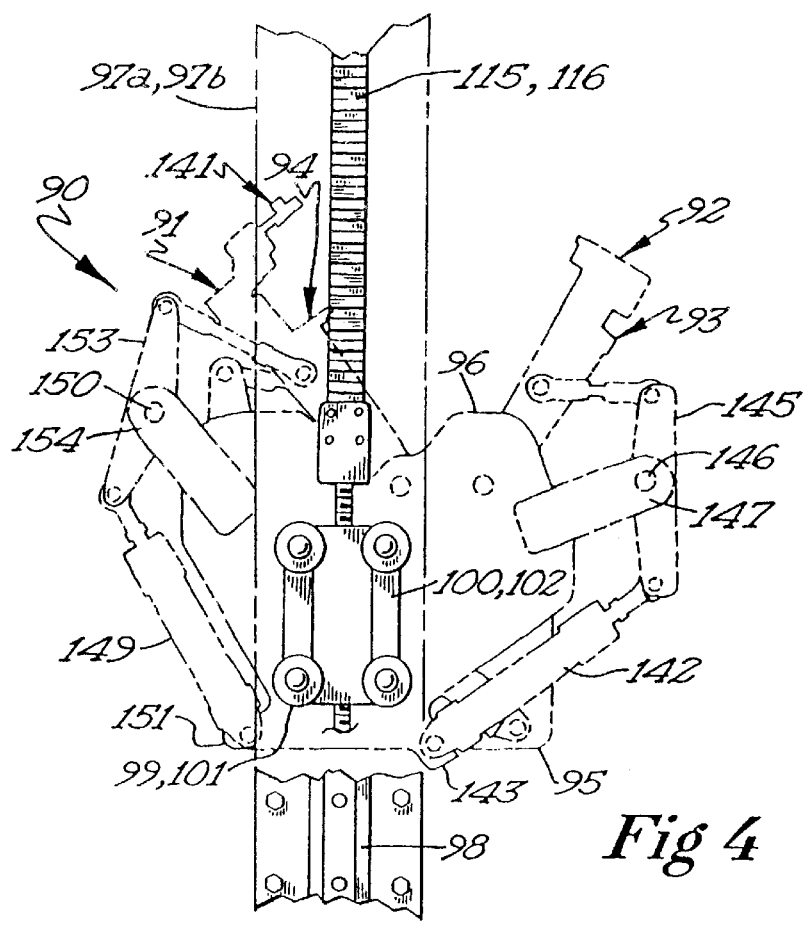
FIG. 4 is a partial side view of a bag closing and sealing apparatus according to the present invention.

For the purpose of actuating the spout clam shell sections 23 and 24 between an open, material dispensing position and a closed position, a power cylinder is preferably mounted between the frame assembly 21 and clam shell spout half 23. Such a clam shell spout assembly and its power cylinder actuator are disclosed in aforementioned U.S. Pat. No. 4,322,932, particularly with reference to FIG. 4 thereof. As disclosed in the '932 patent, the clam shell assembly further includes a connecting rod 33 extending between the upper ends of the two clam shell sections 23 and 24. With this arrangement, the pivotal movement of clam shell half 23 initiated by the power cylinder connected between the frame assembly 21 and clam shell half 23, transmits pivotal movement to the second, clam shell half 24 by means of connecting rod 33. When the piston of the power cylinder connected between the frame assembly 21 and clam shell half 23 is retracted, clam shell sections 23 and 24 are moved to their open positions. As shown in FIG. 2, with the piston extended, the clam shell sections are closed, and no bag filling operation is taking place.

As also disclosed in the '932 patent, spout 22 may be provided with bag clamping means which comprise a pair of bag clamps 34, 35 pivotally mounted adjacent the opening of the spout 22. Each of the bag clamps 34, 35 are mounted upon identical pivotal support arms 36, 37 and are actuated between an open position and a closed position by identical clamp cylinders 38, 39. Bags 19 may be placed on the spout 22 when the bag clamps 34 and 35 are in their open position and are subsequently clamped firmly to the spout 22 when the bag clamps 34, 35 are in their closed position. Bag clamps 34 and 35 are illustrated in their open and closed positions in FIG. 4 of the '932 patent.

Though the use of bag clamps 34, 35 is sufficient to hold a bag 19 to the spout 22 for filling, it is desirable to utilize bag grasping members such as the bag gripping assemblies described in U.S. Pat. No. 5,349,996, the specification of which is hereby incorporated by reference. Such bag gripping assemblies allow for more complete control of the bag 19 during the filling process. Bag gripping assemblies such as those disclosed in the '996 patent may be utilized with bags 19 which have gussets formed into their sides and also with bags 19 having straight or flat sides. However, where bags 19 have gussets formed in their sides, it is preferably to utilize gusset gripping assemblies of the type described in U.S. Pat No. 5,768,863, the disclosure of which is also hereby incorporated by reference.

As shown in FIGS. 1 and 2, the machine also includes a bag supply apparatus generally indicated by reference numeral 40. It is contemplated that various types of bag transporting and conveying mechanisms may be utilized to deliver bags one at a time in position to be picked up and placed on spout 22 by a transfer arm assembly generally indicated by reference numeral 41. The bags 19 may be made of plastic or paper materials, and may be of the pinch bottom or flat bottom type, and have either gusseted or straight side walls.

Bags 19 are preferably placed on the horizontal conveyor 42 by a swing arm mechanism 43 which carries suction cups 44 thereon. The swing arm mechanism 43 rotates between a bag pick up position above a bag storing and supply apparatus (not shown) and a bag delivery and release position for delivering a bag 19 onto the conveyor 42 in a shingled fashion.

The bag storing and supply apparatus is preferably an in-feed conveyor arranged to present a bag 19 or small stacks of bags 19 to the swing arm mechanism 43 for placement on the conveyor 42. An electric eye (not shown) is used to advance the in-feed conveyor of the bag storing and supply apparatus to continuously present additional bag(s) 19 to the swing arm mechanism 43 for placement on the conveyor 42. Alternatively, a carousel-type bag storing and supply mechanism may be utilized. A suitable carousel type bag storing and supply apparatus is disclosed in U.S. Pat. No. 4,884,389, the disclosure of which is hereby incorporated by reference.

The preferred transfer arm assembly 41 is of the same basic construction and operation the transfer arm assembly disclosed in U.S. Pat. No. 4,432,186, the disclosure of which is incorporated by reference. As disclosed in that patent, and with particular reference to the portion of the specification describing FIGS. 15 and 16 thereof, a swingable carriage 46 is mounted to carriage arms 47 at pivot points 48. In turn, carriage arms 47 are pivotably mounted to frame 49 at pivot points 50. Carriage 46 is generally rectangular in shape and its movement relative to frame assembly 21 is controlled by carriage cylinder 51. Carriage cylinder 51 is actuable to move the carriage 46 between a first, bag grasping position, and a second, bag hanging position. A hanging mechanism, generally 52, is pivotally mounted to carriage 46 along shaft 53. Hanging mechanism 52 is pivoted about axis 53 by means of an actuating arm 54 connected to a two-stage cylinder 55 having a first stage 56 and a second stage 57. The other end of two-stage cylinder 55 is pivotably mounted to carriage 46. The hanging mechanism 52 is pivotable about axis 53 between a first, bag grasping position, and a second, bag hanging position.

Hanger mounting plates 58 are slidably mounted on shaft 53 at the upper end, and arm lead screw 59 at the lower end thereby providing for adjusting the width of hanger mechanism 52. As can be seen, lead screw 59 is oppositely threaded on the two ends so as to provide coordinated adjustment. End plates 60 are fixably mounted to shaft 53 at their upper end and allow the rotation of lead screw 59 therein at their lower end while confining lead screw 59 so as to impart a rotational motion about shaft 53 to hanger mechanism 52. Hanger arm 61 extends downwardly from mounting plates 58. Hanger arms 61 are mounted to mounting plates 58 by means of fasteners 62 and rubber spacing blocks 63. Spacing blocks 63 allow a slight amount of lateral motion to be imparted to hanger arm 61 by means of a spread cylinder (not shown) which is mounted between hanger arms 61. The spread cylinder, when actuated, serves to insure the tautness of the bag 19.

Pivotably mounted on the bottom end of hanger arms 61 are clamping arms 64. Clamping arms 64 are actuated by means of clamping cylinders 65 mounted on the outer side of hanger arms 61. Rubber gripping pads 66 are located both on the bottom side of hanger arms 61 and on the top side of clamp arms 64. Fixed vacuum cups 67 and movable vacuum cups 68 are connected to a vacuum source with fixed cups 67 being located at the bottom end of hanger arms 61 and movable cups 68 being located on clamp arms 64. Cups 67 and 68 serve to slightly draw open the mouth of the bag once it is clamped in order to ease the hanging of the bag on the filling chute. The vacuum cups 67 and 68 comprise clamping devices which insure positive, controlled clamping of the leading edge 19a of each bag 19 advanced intermittently on conveyor 42.

Once a plastic or paper bag 19, is secured to the spout 22 by the hanger arms 61, the bag 19 may be filled. A predetermined quantity of material, typically supplied by a bulk supply hopper (not shown) and weighed in a net weigh scale (not shown), is deposited in a supply hopper 69 mounted immediately above the spout 22 on frame assembly 21. An inner supply tube 70 is connected to an outlet 71 of the supply hopper 69. The inner supply tube 70 extends downward and terminates in the spout 22. Slip tube 72 is received over the inner supply tube 70 and is supported from slip tube flange 73. The slip tube 72 may be moved vertically between an upper, inoperative position in which the lower end 74 of the slip tube 72 is withdrawn into the spout 22 and a lower, operative, filling position, in which the lower end 74 of the slip tube 72 is extended down through the open spout clam shell sections 23 end 24 and into a bag 19 that is clamped to the open spout 22 for filling.

The slip tube 72 is moved between its upper and lower positions by lever arm 75. Lever arm 75 pivots about pivot axis 76 and comprises parallel side arms 77 which straddle the slip tube flange 73. Pegs 78 on slip tube flange 73 are received in curvilinear slots 79 formed in the ends of each side arm 77. The curvilinear slots 79 are shaped such that the rotary motion of the lever arm 75 may be translated into vertical motion of the slip tube 72. A rotary linkage 80 is connected between a gearbox 81 and the lever arm 75 to move the lever arm between its upper and lower positions. A motor 82 provides motive power to the gearbox 81 for moving the slip tube 72 between its upper and lower positions.

Material to be placed in the bag 19 passes into the bag 19 from the supply hopper 69 through the inner supply tube 70 and the slip tube 72. By using a slip tube 72, a bag 19 may be filled from the bottom, thereby reducing the amount of dust that would otherwise be produced and promoting the rapid settling of the material within the bag 19. As the bag 19 fills, the slip tube 72 is raised so as to maintain the lower end 74 of the slip tube 72 near the fill level of the material within the bag 19. When the bag 19 has been filled, the slip tube 72 is withdrawn from the bag 19 to its upper, inoperative position. Once the lower end 74 of the slip tube 72 has cleared the spout clam shell sections 23 and 24, the spout 22 closes and the bag is removed from the spout 22 and sealed shut by a bag sealing mechanism, as described in detail below.

Alternatively, a vertical bottom fill auger assembly as disclosed in U.S. Pat. No. 5,109,894, the disclosure of which is hereby incorporated by reference, may be used in place of the slip tube assembly described above. For example, the inner supply tube 70 and the slip tube 72 may be replaced with a fill tube 146 and vertical auger 148 as illustrated in FIG. 1 of the '894 patent. In such an alternate embodiment, the lever arm 75 and its associated linkage 80 would not be necessary.

Either of the slip tube 72 or the fill tube 70 may be provided with a nozzle such as that indicated in phantom lines at 83 in FIG. 1. The nozzle 83 is connected to a blower means or vacuum pump P which would be capable of drawing air from the head space of a filled bag 19 immediately prior to the closing of the bag top 19a. The provision of a blower nozzle 83 reduces the volume of air that would be sealed into a bag 19 and promotes the settling of the material placed in the bag 19.

Referring generally to FIGS. 4–10, a bag closing apparatus according to the present invention is indicated generally at 90 and is comprised of a pair of crimping bar assemblies 91, 92 and a pair of forming bar assemblies 93, 94 that are pivotally mounted between parallel side plates 95, 96. The bag closing apparatus 90 is in this embodiment arranged for vertical movement between a pair of carriage track columns 97a, 97b. Carriage track column 97a has secured thereto a V-roller track 98. V-rollers 99 are secured to a roller mount 100 so as to ride along V-roller track 98 on column 97a. Similarly, straight rollers 101 are secured to straight roller mount 102 so as to ride upon a straight roller track 103 mounted on column 97b. Roller mounts 100 and 102 are secured to parallel side plates 95, 96 so as to permit the bag sealing apparatus 90 to be moved vertically on the respective roller tracks 98 and 103 between a lower, rest and bag release position, and a upper, bag grasping position.

A drive mechanism for moving the bag sealing apparatus 90 between its upper and lower positions is indicated generally in FIG. 1 at 104 The drive mechanism 104 receives power from a rotary motor 105 which is connected by shaft 106 to a right angle gear box 107. Gear box 107 is connected to a sprocket 108 by shaft 109a and to a second right angle gear box 10 by shaft 111. The second gearbox 110 is in turn connected to a second sprocket 112 through shaft 109b. As can be seen in FIGS. 1 and 34, sprockets 108 and 112 are mounted above and in alignment with roller tracks 98 and 103, respectively. Each sprocket 108, 112 has a respective opposing sprocket 113, 114 mounted at the opposite end of their respective roller tracks 98, 103. Sprockets 108 and 113 have supported therebetween a chain or toothed belt 115. The toothed belt 115 is passed around sprockets 108 and 113 and its respective ends are connected to the top and bottom of the v-roller mount 100. Sprockets 112 and 114 also have either a chain or toothed belt 116 supported therebetween. Toothed belt 116, like belt 115 is passed around sprockets 112 and 114 and has its respective ends connected to the top and bottom of the straight roller mount 102. Motor 105 actuates gear box 107 and, through shaft 111, gear box 110. The gear boxes 107, 110 in turn act through respective shafts 109a,b to rotate sprockets 108, 112. In rotating, the sprockets 108, 112 move belts 115, 116 so as to move the bag sealing apparatus 90 between its upper and lower positions illustrated in FIGS. 2 and 5, respectively.

Crimping bar assembly 92 is comprised of a crimping bar 117 that is mounted on a pair of leg members 118, 119. The crimping bar assembly 92 pivots about a pivot axis 120. Forming bar assembly 93 is similarly comprised of a forming bar 121 that is mounted upon leg members 122, 123 and is also pivotable about pivot axis 120. Forming bar assembly 93 is narrower than crimping assembly 92 and has shorter leg members 122, 123 so that the forming bar assembly 93 may rotate within crimping bar assembly 92 about pivot axis 120.

Crimping bar assembly 91 is comprised of a crimping bar 124 mounted on leg members 125, 126. Leg members 125, 126 pivot about pivot axis 127. Forming bar assembly 94 is comprised of a forming bar 128 mounted on leg members 129, 130. Leg members 129, 130 are also pivotable about pivot axis 127. Similar to the arrangement of crimping bar assembly 92 and forming bar assembly 93, forming bar assembly 94 is narrower than crimping assembly 91 and has shorter leg members 129, 130 so that the forming bar assembly 94 may rotate within crimping bar assembly 91 about pivot axis 127.

Crimping bar assemblies 91, 92 are arranged to engage a bag top 19a at the location where the top 19a is to be creased and folded over for sealing. Forming bar assemblies 93, 94 are arranged to engage and hold a bag 19 somewhat above the level to which the bag 19 has been filled and below the point at which the crimping bar assemblies 91, 92 engage the bag top 19a. The embodiment of the bag sealing apparatus 90 illustrated in FIGS. 5–10, is intended to address a bag 19 to be sealed from below. However, it is to be understood that by modifying the arrangement of the forming bar and crimping bar assemblies, the bag sealing apparatus 90 may be adapted to addressing bags to be sealed from above rather than from below.

Forming bars 121, 128 are symmetrically opposable with one another, i.e. they are constrained to operate in conjunction with one another. Forming bars 121, 128 are pivotable between a first, open position wherein the forming bars 121, 128 are rotated apart from one another, and a second, closed position, wherein the forming bars 121, 128 are rotated into contact with one another. The respective faces 131, 132 of the forming bars 121, 128 are arranged so that forming bars 121, 128 may firmly grasp a bag 19 that is to be sealed by the bag sealing apparatus 90. In one embodiment of the bag sealing apparatus 90, face 132 of forming bar 128 is in the form of male tongue, and face 131 of forming bar 121 is in the form of a cooperating female groove. The female groove of face 131 is sized so as to receive the male tongue of face 132, firmly grasping a bag 19 therebetween in the process. It is to be understood that faces 131, 132 of the forming bars may be of any geometric shape or have any surface treatment useful in the grasping of a bag 19. For instance, faces 131, 132 may be roughened as by knurling, to provide a better grip on the bag 19.

Figure 5:
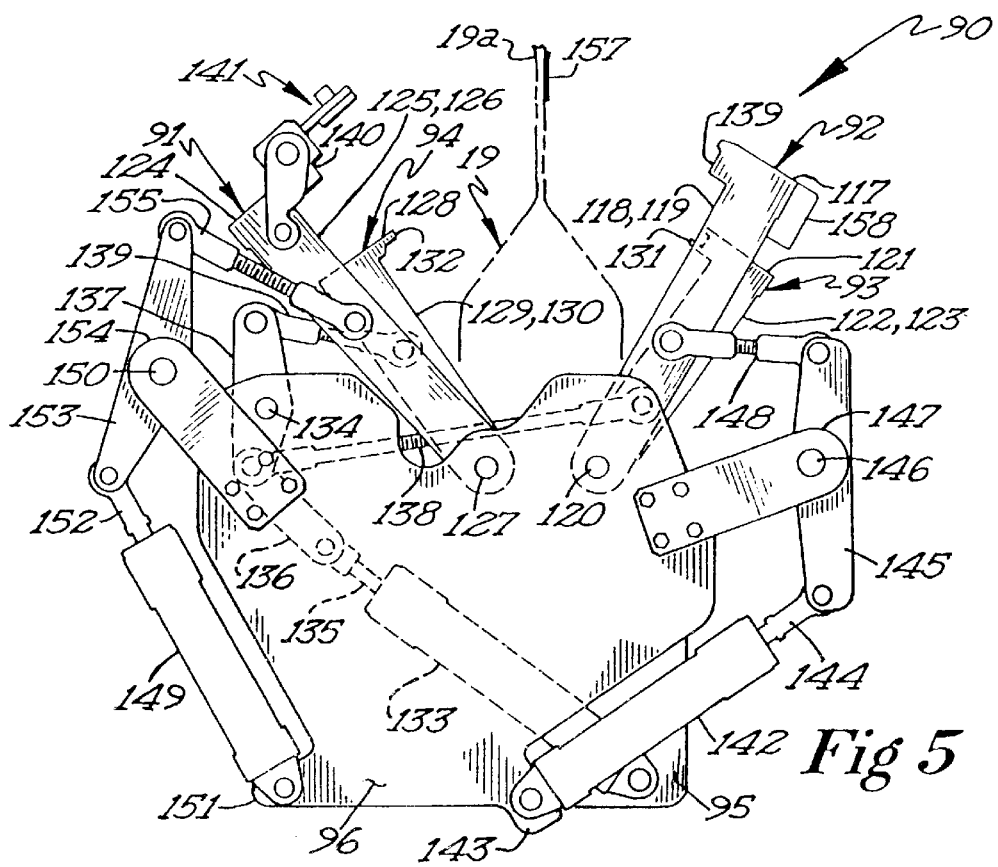
FIG. 5 is a partial side view of the bag closing and sealing apparatus showing the relation between the bag closing and sealing apparatus and a bag to be closed and sealed at the beginning of an operational cycle.
Figure 6:
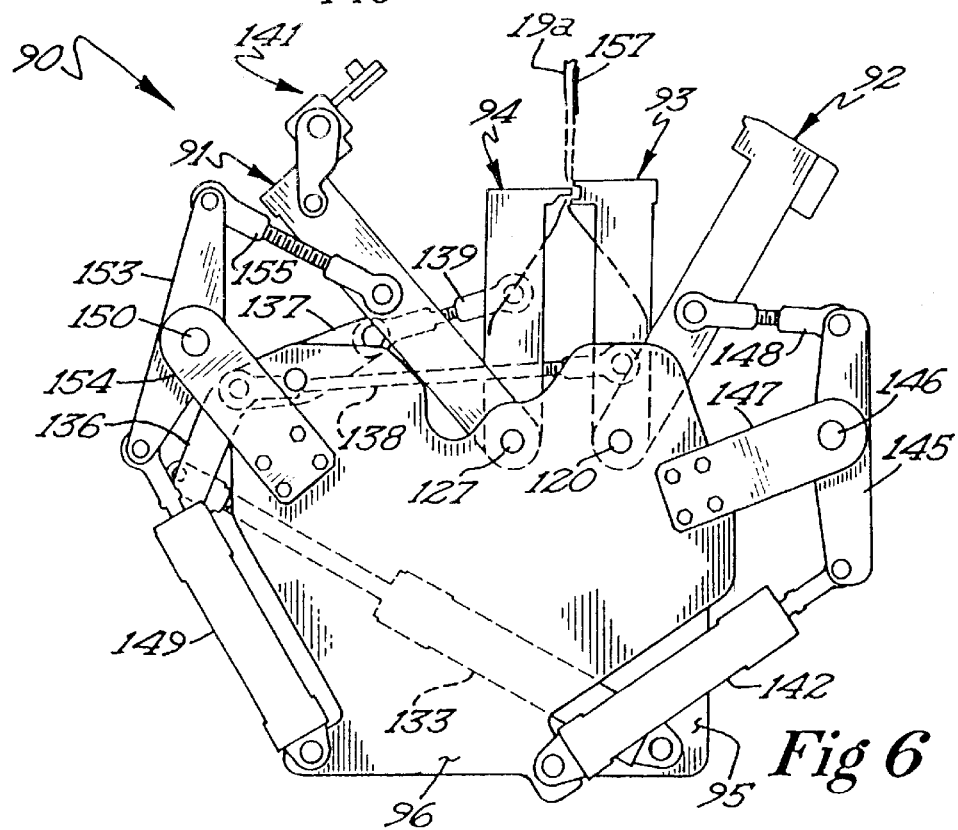
FIG. 6 is a partial side view of the bag closing and sealing apparatus showing a bag securely clamped and grasped between the forming bars of the bag closing and sealing apparatus.

The operating mechanism for actuating the forming bars 121, 128 between their first open position and their second closed position is most clearly viewable in FIGS. 5–8. A reversible double acting power cylinder 133 serves to reversibly actuate an over enter linkage mechanism having a transversely extending crankshaft 134. Power cylinder 133 is pivotally mounted on side plate 95 and its piston 135 is connected through a link 136 with a crank arm 137 mounted on the crankshaft 134. Connecting rod 138 extends between the lower end of crank 137 and oppositely positioned leg member 123 of forming bar assembly 93. A second connecting rod 139 extends from the upper end of crank 137 to adjacent leg member 130 of forming bar assembly 94. To provide even clamping pressure between the forming bars 121, 128, a second crank arm 137 and associated connecting rods 138, 139 are mounted on the crankshaft 134 adjacent side plate 96 to actuate leg members 123, 126. As shown in FIG. 5, with the piston 135 of cylinder 133 retracted, the linkage has moved the forming bars 121, 128 apart to their fully opened positions. Upon the extension of the piston 135 of cylinder 133, to the position shown in FIG. 6, the aforesaid mechanical linkage will pivot forming bars 121, 128 towards each other to their closed, bag engaging and clamping positions. A strong, effective closing and clamping action of the forming bars 121, 128 is achieved upon the extension of piston 135, as it operates the aforesaid linkage to pull connecting rod 139 to the left as viewed in FIG. 6, and to push connecting rod 138 to the right, thereby swinging the forming bar assemblies 121, 128 towards each other so as to place forming bars 121, 128 in their closed positions as shown in FIG. 6.

Crimping bar assemblies 91, 92 are operable independent of one another. Crimping bar assemblies 91, 92 are pivotable between first, open positions in which the respective crimping bars 124, 117 are rotated away from one another, and closed positions in which the respective crimping bars 124, 117 are rotated into contact with one another. Because crimping bar assemblies 91, 92 are independently actuable, the crimping bars 124, 117 may simultaneously be in their closed positions or one may be in its open position while the other is in its closed position.

Crimping bars 117, 124 are constructed such that the faces 139, 140, of the respective crimping bars may cooperate so as to crimp or crease a bag top 19a and partially fold the top 19a that is being sealed by the bag sealing apparatus 90. In one embodiment of the bag sealing apparatus 90, face 140 of crimping bar 124 comprises at its upper edge a crimping projection, with face 139 comprising a crimping projection complementary to the crimping projection of face 140. The respective crimping projections of faces 139, 140 are is arranged to engage one another in a scissors-like action that pinches a bag top therebetween to form a transverse crease C (FIG. 8) across the top 19a of the bag 19. This transverse crease C allows the folding mechanism such as fold-over arm 141, which is mounted to an upper surface of crimping bar 124, to fold the bag top 19a down into contact with the side wall of the bag 19. It should be understood that faces 139, 140 of the crimping bars 117, 124 may be of any shape suitable to pre-fold or crease a bag top 19a prior to the actual closing of the bag top by a bag sealing apparatus 90.

Crimping bar 117, supported on leg members 118, 119 is actuated between its open position, and its closed position by a reversible double acting power cylinder 142. Cylinder 142 is pivotally mounted to a projection 143 of side plate 96. The piston 144 of cylinder 142 is connected to a crank arm 145 mounted upon a transversely extending crankshaft 146. Each of the leg members 118, 119 has associated therewith a crank arm 145, each crank arm 145 being secured to the transversely extending crankshaft 146. The crankshaft 146 is rotatably mounted between a pair of rearwardly extending brackets 147 secured to the respective side plates 95, 96.

Figure 7:
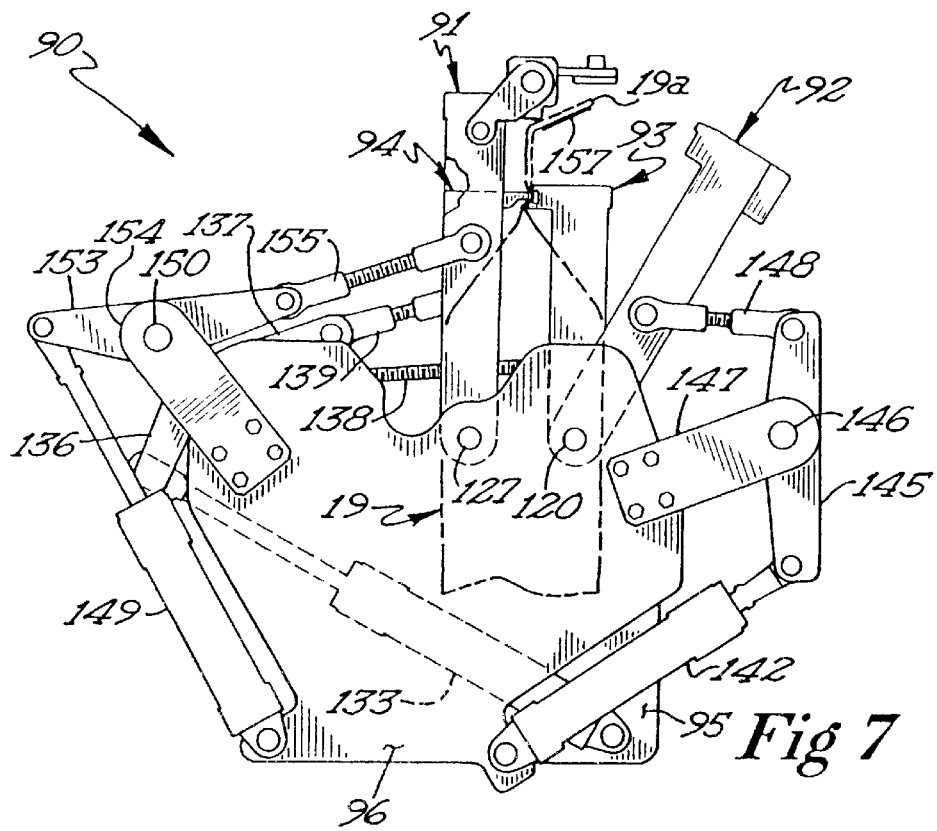
FIG. 7 is a partial side view of the bag closing and sealing apparatus showing the crimping and sealing bars engaging the top of a bag being closed and sealed.

Each of the leg members 118, 119 is connected to their respective crank arms 145 by respective connecting arms 148. When piston 144 of power cylinder 142 is retracted as illustrated in FIG. 5, the lower end of the crank arm 145 is drawn downward and to the left, thereby causing connecting 148 to pull leg members 118, 119 to the right, moving crimping bar 117 to its open position. Conversely, extension of piston 144 of power cylinder 142 pushes the lower end of the crank arm 145 upward and to the right, thereby causing connecting arms to push leg members 118, 119 to the left, moving crimping bar 117 to its closed position as illustrated in FIG. 7.

Figure 8:
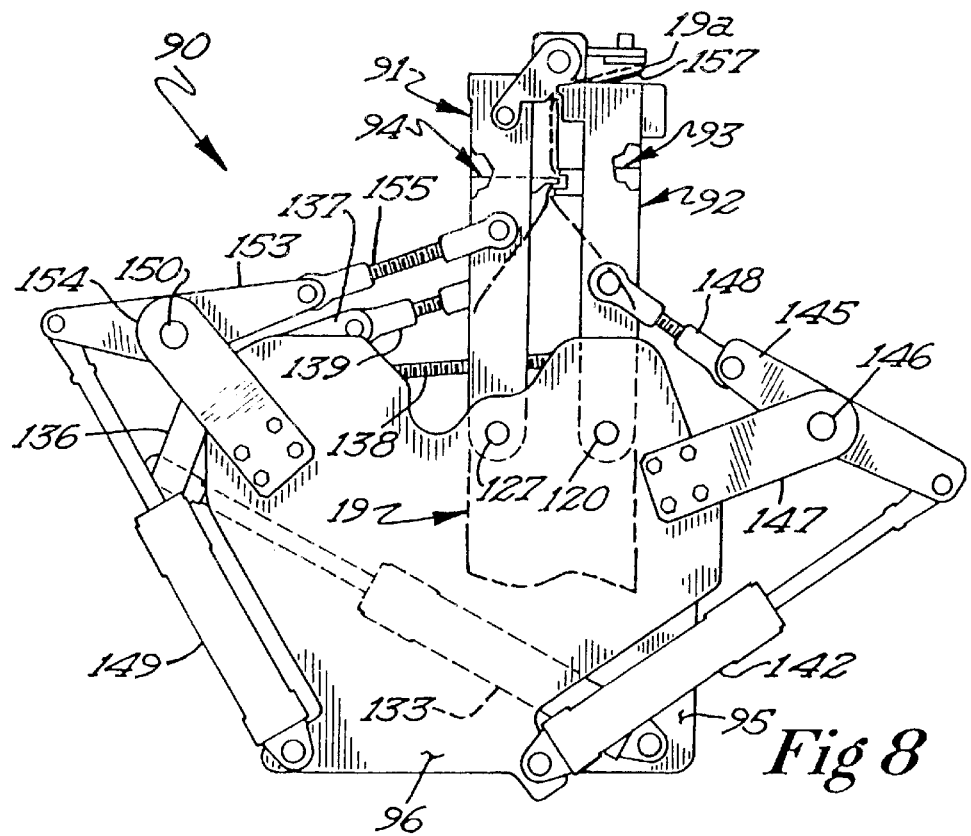
FIG. 8 is a partial side view of the bag closing and sealing apparatus showing the crimping and sealing bar having a thereto preparing to engage and fold over for sealing the top of a bag being closed and sealed.

Crimping bar 124, supported on leg members 125, 126 is actuated between its open position, and its closed position by a reversible double acting power cylinder 149. Power cylinder 149 serves to reversibly actuate an over-center linkage mechanism having a transversely extending crankshaft 150. The power cylinder 149 is pivotally mounted to a second projection 151 of side plate 96. The piston 152 of cylinder 149 is connected to crank 153 that is mounted on crankshaft 150. Crankshaft 150 is rotatably mounted between a pair of upwardly extending brackets 154 mounted to respective side plates 95, 96. Crankshaft 150 has two cranks 153 secured thereto so as to permit the simultaneous actuation of both leg members 125, 126. Cranks 153 are connected at their upper ends to respective leg members 125, 126 by identical connecting rods 155. When piston 152 of power cylinder 149 is retracted as illustrated in FIGS. 5 and 6 the lower end of cranks 153 are pulled downwardly and to the right thereby causing connecting rods 155 to pull leg members 125, 126 to the left, moving crimping bar 124 to its open position. Extension of piston 152 of the power cylinder 149 causes the lower ends of the cranks 153 to be pushed upwardly and to the left thereby causing connecting arms 155 to move leg members 125, 126 to the right, moving crimping bar 124 to its closed position as illustrated in FIGS. 7 and 8.

Where bags 19 are made from paper, crimping bars 117, 124 need only be utilized to mechanically crimp or crease the top of a paper bag 19 that is being sealed. But where the bags 19 are made from plastic, heat sealing mechanisms may be provided for heat sealing the mouths of the plastic bags 19 being filled. In one alternate embodiment of the present invention, a heat sealing cartridge may mounted on crimping bar 117 or 124 with mating grooves or serrations formed on the opposite crimping bar. Alternatively, an impulse heat scaler may also be utilized, and, for the sealing of plastic bags. Such a heat sealing element comprises a thin flat conductive wire which extends the height of the vertical face of the crimping or sealing bar 117, 124. Depending upon the thickness and composition of the bags 19 being sealed, two such conductive wires may be utilized, one mounted on the vertical faces 139, 140 of the crimping bars 117, 124. Reference numeral 156 as shown in FIG. 2 generally indicates a heating element carried by crimping bar 117. It is to be understood that either or both of the crimping bars 117, 124 may be outfitted with heating elements 156. In addition to the sealing of plastic bags 19, heating elements 156 may be utilized to seal a plastic liner of a paper bag 19. It is contemplated that the bag sealing apparatus 90 as illustrated in FIGS. 5–8 may be utilized to seal both plastic and paper bags 19 without having to modify the forming or crimping assemblies 93, 94 or 91, 92, respectively.

Where required, forming bar assemblies 93, 94 may also be provided with heating elements 156 that may be useful in sealing plastic bags 19 or in sealing a plastic liner of a paper bag 19.

Paper bags 19 are preferably sealed by activating a heat sensitive adhesive 157 that has been pre-applied to the side wall of the bag 19 being sealed. In order to activate the adhesive 157, a heater 158 is mounted to the upper surface of crimping bar 117. The adhesive 157 is applied to the outer side wall of the paper bag 19 above the transverse crease C that is formed when the faces 139, 140 of the crimping bars 117, 124 engage the top of the bag 19. The location of the heater 158 is carefully arranged so that when the top portion of the bag side wall having the adhesive 157 applied thereto is folded over by the crimping bar assemblies 91, 92, the adhesive 157 will be brought close enough to the heater 158 to activate the adhesive 157. The heater 158 must be capable of raising the temperature of the adhesive 157 without coming into contact with the adhesive 146. Contact between the heater 158 and the adhesive 157 could prevent the bag sealing apparatus 90 from sealing a bag 19 and would necessitate the frequent cleaning the of the heater 158 and the crimping assemblies 91, 92. The preferred heater 158 is a hot air heater which blows heated air onto the adhesive 157 to activate it. Another type of heater 158 which may be utilized is a radiant heater which activates the adhesive 157 using infrared energy.

Figure 9:
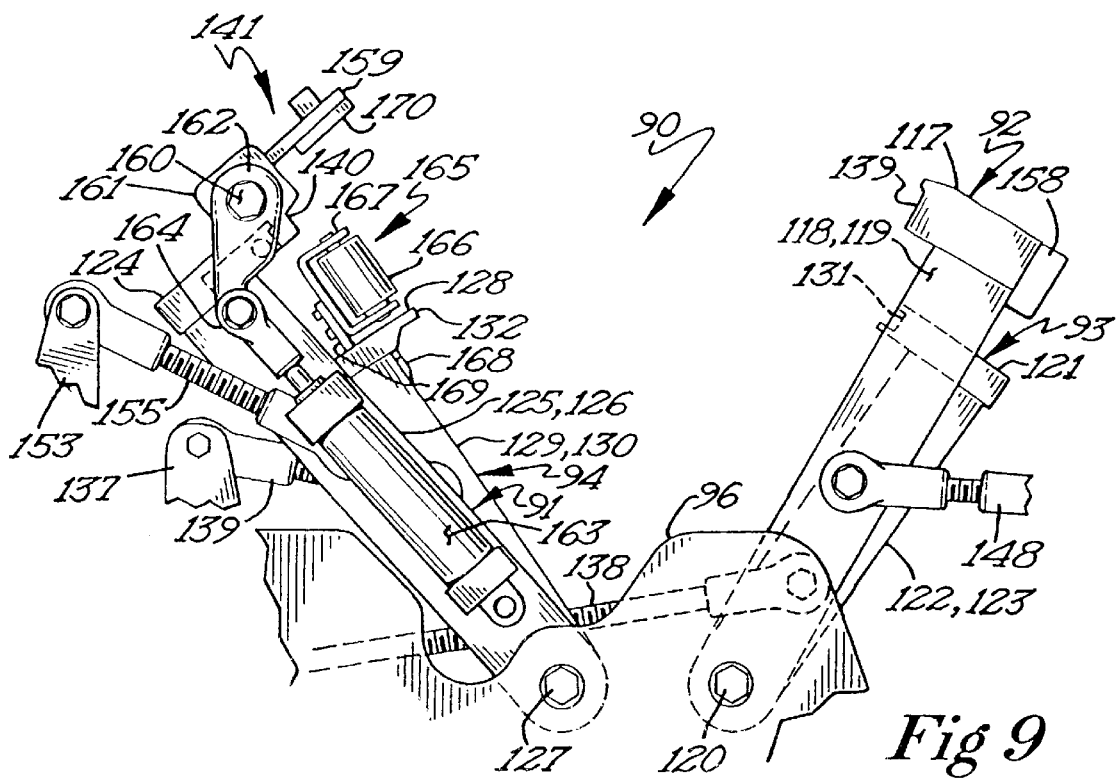
FIGS. 9 and 10 are partial cut away side views illustrating the structure and operation of the of the fold-over arm secured to one of the crimping and sealing bars.
Figure 10:
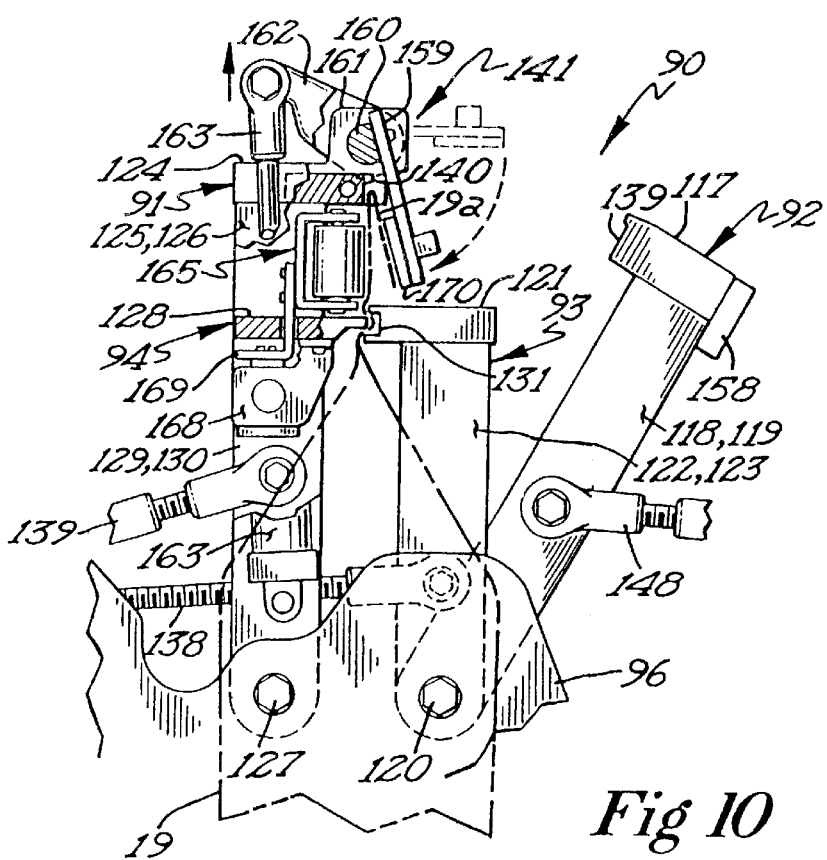

Once a bag top 19a that is being sealed has been crimped by the crimping bar assemblies 91, 92 and the adhesive 157 has been activated by the heater 158 crimping bar assembly 92 is rotated away from crimping bar assembly 91 and fold-over arm 141 is actuated to fold the top of the bag 19 above the transverse crease C into contact with the side of the bag 19 below the transverse crease, thereby sealing the paper bag. Fold-over arm 141 is best seen in FIGS. 9 and 10. Fold-over arm 141 is comprised of a platen 159 secured to a transversely extending shaft 160 that is rotatably mounted in a pair bearings 161 on crimping bar 124. The platen 159 is rotatable between first, open position illustrated in FIG. 9 and a second, closed position, illustrated in FIG. 10. The ends of the shaft 160 extend beyond the ends of the crimping bar 54 and have attached thereto a pair of crank arms 162. Crank arms 162 and hence, the platen 159, are rotated by a pair of reversible, double acting power cylinders 163. Power cylinders 163 are pivotally mounted on the outer surface of leg members 125, 126 and pistons 164 of cylinders 163 are connected to crank arms 162. A single power cylinder 163 may be utilized to rotate the platen 159 to its closed position in sealing a bag top, however, it is believed that the use of two cylinders 163 leads to a more uniform sealing pressure across the folded bag top. When the pistons 164 of cylinders 163 are retracted, as shown in FIG. 9, the crank arms 162 are rotated downward, toward the cylinders 163 and the platen 159 is rotated upward to its open position. Extension of the pistons 164 rotates the platen 19 downward into its closed position, as shown in FIG. 10.

In its closed position, the fold-over arm 141 applies clamping pressure to the folded bag top in order to ensure that the adhesive 157 may properly seal the bag top closed. A backing mechanism 165 is secured to the upper surface of forming bar 128 so as to oppose the platen 159 of the fold-over bar 141. The backing mechanism 165 may be as simple as a stationary plate welded to the top of the forming bar 128. However, with this embodiment a plurality of straight rollers 166 mounted within a horizontally reciprocable roller frame 167 are utilized as a backing mechanism. A horizontal double acting roller actuation cylinder 168 is secured beneath the forming bar 128. Bracket 169 is secured to the piston of the cylinder 168 and connects cylinder 168 to the roller frame 167 to permit reciprocation of the rollers 166. Platen 159 has a pad 170 secured thereto and across the entire width of the platen 159. In this embodiment, the pad 170 is of a soft, elastomeric material, though it may be desirable to utilize a stiffer material such as a nylon or Teflon (™). When a bag top 19a has been folded over by the fold-over arm 141 and platen 159 is exerting pressure through the folded bag top against the rollers 166, cylinder 168 is actuated to cause the rollers 166 to reciprocate. The reciprocating pressure exerted upon the bag top by the rollers 166 as they move back and forth across the bag top 19a causes the folded over bag top 19a to be more evenly adhered to the bag side wall.

A horizontal conveyor 171 as shown in the various Figures of the drawing and particularly FIGS. 1 and 2, is positioned at the bottom of the frame assembly 21 under bag sealing apparatus 90 to receive filled bags 19 one at a time as the bag sealing apparatus is lowered to its bottom position as illustrated in FIG. 2. It is to be understood that various types of conveying devices could be utilized to receive filled bags one at a time from the machine 20, and to deliver the bags out of the machine. Filled bags 19 may be deposited in an upright position for removal on conveyor 180. Alternatively, guide baffles or contact rods (not shown) disposed in the path of the filled bags 19 as they are released from bag sealing mechanism 90 may be utilized to deflect the bags to a horizontal position for removal on conveyor 171, if desired. Preferably, filled bags 19 will be released by the forming bar assemblies 93, 94 of the bag sealing apparatus 90 after the bottoms of the filled bags have contacted the moving conveyor 171 and been offset from the top of the filled bags 19. Releasing the filled bags 19 when the bottom of the filled bag 19 is not placed directly beneath the top of the bag will cause the bag 19 to tip over onto its side of its own accord without the need of guide baffles or contact rods.

OPERATIONAL SEQUENCR OF BAG FILLING MACHINE

The operation of the machine 20 through a complete cycle is fully controlled and automated to selectively position the several operating components, including spout 22, transfer arm assembly 41, and bag sealing apparatus 90 in optimum, cooperative positions for maximum, high speed handling and filling of bags 19. The top 19a of each bag 19 is positively gripped and controlled from the supply station 40, through the operation of transfer arm assembly 41, the filling of bags on spout 22, the sealing of bags 19 by crimping bar assemblies 91, 92 and forming bar assemblies 93, 94 on bag sealing apparatus 90, and the ultimate delivery of filled bags onto conveyor 171.

As the bag filling machine is intended to operate continuously, each distinct operating cycle may be overlapped by preceding and succeeding cycles. However, in general, each operating cycle commences with the various components of the bag filling machine 20 in the positions shown in FIG. 2. At this point in time, the bag sealing apparatus 90 is at its lower, rest and bag release position, with forming bar assemblies 93, 94 and crimping bar assemblies 91, 92 swung to their open positions. Spout 22 is typically closed at the beginning of a cycle but is in FIG. 2 illustrated as being open with a bag 19 suspended therefrom by bag clamps 34, 35 for the filling of the bag 19. The transfer arm assembly 41 begins each cycle in substantially the position as shown in FIG. 2, with suction clamps 67 and 68 open. A supply of bags 19 is provided, preferably in a shingled fashion as shown in FIGS. 1 and 2 on supply conveyor 42.

Figure 3:
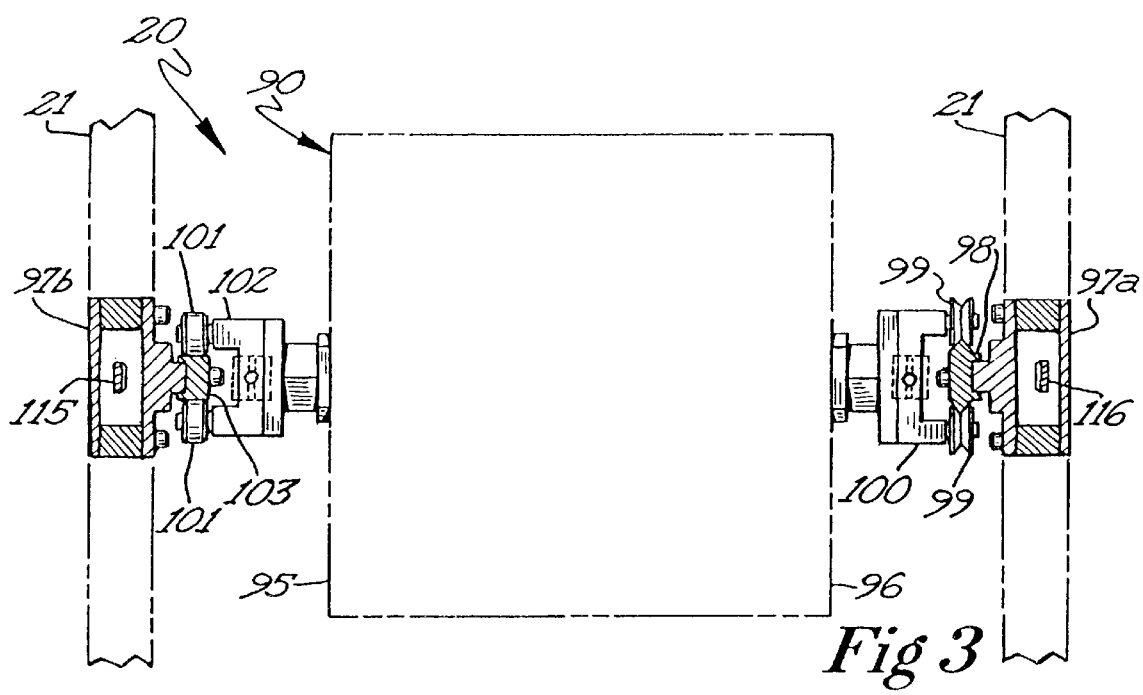
FIG. 3 is a partial top view of the bag closing and sealing apparatus taken along cutting lines 3—3 in FIG. 2.

The bag supply apparatus (not shown) is preferably of the in-feed conveyor type or, alternatively, the bag supply apparatus 40 may be of the carousel type as described above with respect to U.S. Pat. No. 4,884,389. In either case, the preferred swing arm mechanism 43 incorporating a plurality of suction cups 44 is actuated as described in the +389 patent with respect to FIGS. 2–4 to pick up a bag 19 from the bag supply mechanism (not shown) The arm 43 then swings to a bag release position to drop the bag 19 so that the bag 19 is guided onto the supply conveyor 42. This process is repeated to provide a shingled formation of bags 19 on the conveyor 42. A sensor, such as an electric eye (not shown) is positioned to detect the leading edge 19a of a bag 19 positioned at the delivery end of conveyor 42 as shown in FIGS. 1 and 2 for pickup by transfer arm assembly 41. When the sensor provides a signal what a bag 19 is in position for pickup, clamping cylinders 65 are extended on clamping arms 64 to grasp the top of bag 19. At this stage, carriage 46 is in its bag grasping position as are bag hanger arms 61.

In hanging a bag 19 on the spout 22, carriage cylinder 51 is retracted to swing the carriage 46 outwardly while at the same time the first stage 56 of two-stage cylinder 55 extends, thereby swinging hanger arms 61 outwardly and upwardly and placing bag 19 closely adjacent to spout 22 which is in the process of finishing the filling of a bag 19 thereon. When the bag 19 filled during the preceding operational cycle has been removed from the spout 22 and is being sealed and lowered to out feed conveyor 171 by the bag sealing apparatus 90, the second stage 57 of cylinder 55 extends, thereby placing bag 19 in position on spout 22 where it may be gripped and clamped by spout bag clamps 34, 35 and gusset forming and holding clamps as described in more detail above. As soon as the bag has been gripped at spout 22, gripper cylinders 65 retract thereby releasing the bag 19 from the bag clamping arms 64.

With a bag 19 thus securely clamped on spout 22, carriage cylinder 51 and cylinder 55 are actuated to move bag clamping arms 64 to their first, bag grasping position as indicated in FIG. 2 to pick up the next empty bag 19 from conveyor 42 as described above.

When the sensing eye detects the absence of the leading edge of a bag at the forward end of conveyor 42, the conveyor 42 is indexed forward and stops. The swing arm mechanism 43 is then again actuated to pick up a bag 19 from the bag storage and supply apparatus and drop it onto conveyor 42. Thus, conveyor 42 is intermittently indexed forward in coordination with the grasping of the lead bag 19 by the bag clamping arms 64 of transfer arm assembly 41.

When bag sealing apparatus 90 has moved downwardly with the previously filled bag 19 to a position below the bottom of the next, empty bag 19 hanging on spout 22, spout 22 is opened by its actuating cylinder (not shown). As spout 22 is opening, motor 82 is actuated to rotate rotary linkage 80 to move the slip tube 72 from its upper, inoperative position, to its lower, bag filling position in which the lower end 74 of the slip tube 72 is extended through the opened spout 22 and into the bag 19 clamped to the spout 22. Material to be placed in the bag 19 then passes into the bottom of the bag 19 from the lower end 74 of the slip tube 72. As motor 82 continues to actuate rotary linkage 80, and as bag 19 begins to fill, the lower end 74 of the slip tube 72 begins to rise up from its position near the bottom of the bag 19, thereby filling the bag 19 from the bottom up. The slip tube 72 then finishes its stroke and is retracted back into the spout 22. Filled bag 19 as thus located, is substantially centered over bag sealing apparatus 90 in position to be engaged by the forming bar assemblies 93 and 94 and crimping bar assemblies 91 and 92. At this point in the cycle, the filling of a bag 19 has been completed, and the actuating cylinder (not shown) is again actuated to move the clam jaws 23 and 24 to a fully closed position.

Next, a servomechanism or other control device actuates drive motor 105. The rotation of drive shaft 106 serves to revolve toothed carriage lift belts 115 and 116 so as to raise bag sealing apparatus 90 upwardly to the position shown in FIG. 5, with the forming and crimping bars open. Cylinder 133 is then actuated to rotate crank 137 and to thus pivot forming bar assemblies 93 and 94 inwardly into clamping engagement with the opposite sides of bag top 19a as shown in FIG. 6. This event serves to trigger the actuation of cylinders 38 and 39 so as to swing spout clamps 34 and 35 to their open, bag releasing positions, thereby releasing the filled bag 19 to the bag closing apparatus 90.

The servomechanism thereafter again actuates drive motor 105 in a reverse direction so as to revolve belts 115 and 116 in a direction so as to lower bag sealing apparatus 90. This is done in order to clear the top area 19a of the bag mouth from the bottom end of spout 22. When the of bag sealing apparatus 90 has been lowered to the position shown in FIG. 7, i.e. when the bag top 19a has cleared the lower lip of the spout 22, power cylinders 142 and 149 are actuated. The extension of pistons 144 and 152 serves to rotate cranks 145 and 153 on crankshafts 146 and 150 so as to swing crimping bar assemblies 92 and 91 inwardly against the opposite sides of the top 19a of the bag, to a closed position as shown in FIG. 7. It should be noted that the bag sealing position of the crimping bars 91 and 92 as shown in FIG. 7, is above the forming bar Assemblies 93 and 94. By virtue of this arrangement, the full weight of the bag is held by forming bar assemblies 93 and 94, engaged as shown in FIGS. 5–8 in a tongue-in-groove arrangement. Thus, there is no downward weight acting on crimping bar assemblies 91 and 92 which might otherwise cause the bag mouth to tear during the sealing operation. The closing movement of crimping bar assemblies 91 and 92 is initiated upon a predetermined downward travel of bag sealing apparatus 90.

As the bag top 19a is grasped firmly between the crimping bars 117, 124, the crimping projections formed in the respective faces 139, 140 of the bars act to form the transverse crease C across the bag top 19a, thereby partially folding the bag top 19a over in a predetermined direction. The partial folding of the bag top 19a brings the pre-applied heat sensitive adhesive 157 on the bag top adjacent to a heater 158 mounted on the crimping bar 117 as illustrated in FIGS. 5–10.

After a predetermined dwell time sufficient for the heater 158 to have activated the heat sensitive adhesive 157 has elapsed, cylinder 142 is actuated to retract piston 144, thereby opening crimping bar assembly 92 as shown in FIG. 8. Crimping bar assembly 91 remains in its closed position for the sealing of the bag top 19a. When crimping bar assembly 92 has cleared the partially folded bag top, cylinders 163 are actuated to extend pistons 164, thereby rotating platen 159 into contact with the bag top 19a as shown in FIG. 10. In its downward rotation, platen 159 causes the bag top to fold over at the transverse crease C such that the heat sensitive adhesive 157 contacts the side wall of the bag 19. Platen 159 urges the folded bag top into contact with a plurality of rollers 166 which are then reciprocated against platen 159 to ensure that adhesive 157 has securely sealed the top of the bag 19.

After a predetermined dwell time sufficient for the action of the rollers 166 against the elastomeric pad 170 of the platen 159 to have securely sealed the bag top, cylinders 163 are actuated to rotate the platen 159 away from the bag top 19a. When the bag top 19a has been released by the platen 159, cylinder 149 is actuated to retract piston 152, thereby pivoting crimping bar assembly 91 away from the bag 19 to its open position as illustrated in FIG. 6. This will normally be accomplished before bag sealing apparatus 90 reaches the lower extremity of its travel. When bag sealing apparatus 90 does reach that lowermost, rest position as shown in FIG. 2, drive motor 105 is deactivated and cylinder 133 is actuated to retract its piston 135. With this operation, forming bar assemblies 93 and 94 are swung to their open positions and a filled and sealed bag 19 is released to drop down onto conveyor 171. Successively dropped, filled bags 19 are carried away by conveyor 171 as illustrated in FIGS. 1 and 2. After a filled bag 19 has been deposited on conveyor 171, with bag sealing apparatus 90 at the bottom of its travel path as shown in FIG. 2, the bag sealing apparatus 90 is ready to move up to clamp and seal the next bag.

Where plastic bags are to be clamped and sealed by the bag sealing apparatus 90, one or both of the crimping bar assemblies 91, 92 may be provided with heat sealing elements 156. In this case, the crimping bar assemblies 91, 92 would close on the top of a plastic bag 19 and the heat sealing element(s) 156 would be activated to seal the top of the bag 19 closed as shown in FIG. 7. There would be no need to actually fold the top of a sealed plastic bag 19 over utilizing the fold-over arm 141. After a predetermined dwell time had elapsed, the heat sealing element(s) 144 would be de-energized, and a fraction of a second cooling time would be allowed. It is noteworthy that the sealing of the bag mouth and the subsequent cooling of the crimping bars 117 and 124 in this application would take place very rapidly during the downward travel of the bag sealing apparatus 90. Sealed, filled plastic bag 19 would be deposited on the conveyor 171 by the bag sealing apparatus 90 as indicated above.

Alternatively, a heat sealing element(s) 156 could be utilized in conjunction with the sealing of paper bags 19 having plastic liners. In this instance the heat sealing element(s) 156 would be activated to seal the plastic liner when the crimping bar assemblies 91, 92 have been pivoted to their closed positions to crease and partially fold the top of the bag 19. What is more, heat sealing element(s) 156 may be provided on forming bars 123, 128 for the purpose of sealing plastic liners of paper bags.

PREFERRED EMBODIMENT OF THE INVENTION

In this preferred embodiment of the bag sealing mechanism 190, the forming bars 121, 128, have been provided with an inner liner sealing mechanism 200. This mechanism comprises a pair of inner liner sealing bars 201, 202 that are rotated between a first, inoperative position (illustrated in FIG. 11) and a second, operative position (illustrated in FIG. 13) by a pair of cam plates 208 mounted between the side plates 95, 96. The preferred embodiment of the present invention further comprises an improved fold over mechanism 250 mounted to crimping bar 252.

Because the sides of the bag sealing mechanism 190 of the present invention are substantially mirror images of one another, FIGS. 11–15 show only one side of the mechanism 190. FIGS. 11–15 are cut away drawings of the bag sealing mechanism 190 viewed parallel to the forming and crimping bars. FIGS. 16 and 17 are full side views of the bag sealing mechanism 190.

The heat sealing mechanism 200 comprises a pair of opposing inner liner sealing bars 201, 202 rotatively and opposably mounted upon respective pairs of U-shaped arms 203, 204 and 205, 206. The respective pairs of U-shaped arms 203, 204 and 205, 206 are rotatively mounted, as by bearings 207, between the leg members 122, 123 and 129, 130 that support forming bars 121 and 128. The inner lining sealing bars 201, 202 are pivoted between their first and second positions by cam plates 208. Cam plates 208 are affixed to the pistons 209a of a pair of two-way power cylinders 209 each of which is secured to the inner surface of a respective side plate 95 and 96. The inner lining sealing bars 201, 202 are symmetrically opposable and engage one another to clamp therebetween the bag 19. The location at which the sealing bars 201, 202 engage the bag 19 is preferably above the location at which the forming bars 121, 128 actually grip and support the filled bag 19. It must be understood however, that the inner liner sealing bars 201, 202 may be arranged, if so required, to engage a bag 19 below the location where the forming bars 121, 128 have gripped the bag 19 to hold it for sealing.

The inner liner sealing bars 201, 202 have faces formed to securely clamp the bag top therebetween and are preferably heated as by electrical resistance to heat seal the inner liner of a bag 19 at the line defined across the bag top by the inner liner sealing bars 201, 202. It is important to note that the sealing bars 201, 202 seat the inner liner of bag 19 at a location that is offset from the location at which the top of the bag 19 is crimped to allow it to be folded over. Preferably the inner liner of the bag 19 is sealed at a location below the transverse crease C formed into the bag top 19a, however, it must be understood that it is within the purview of this invention for the sealing bars 201, 202 to seal the inner liner of the bag 19 above the transverse crease C created by crimping bar assemblies 191, 192.

Figure 11:
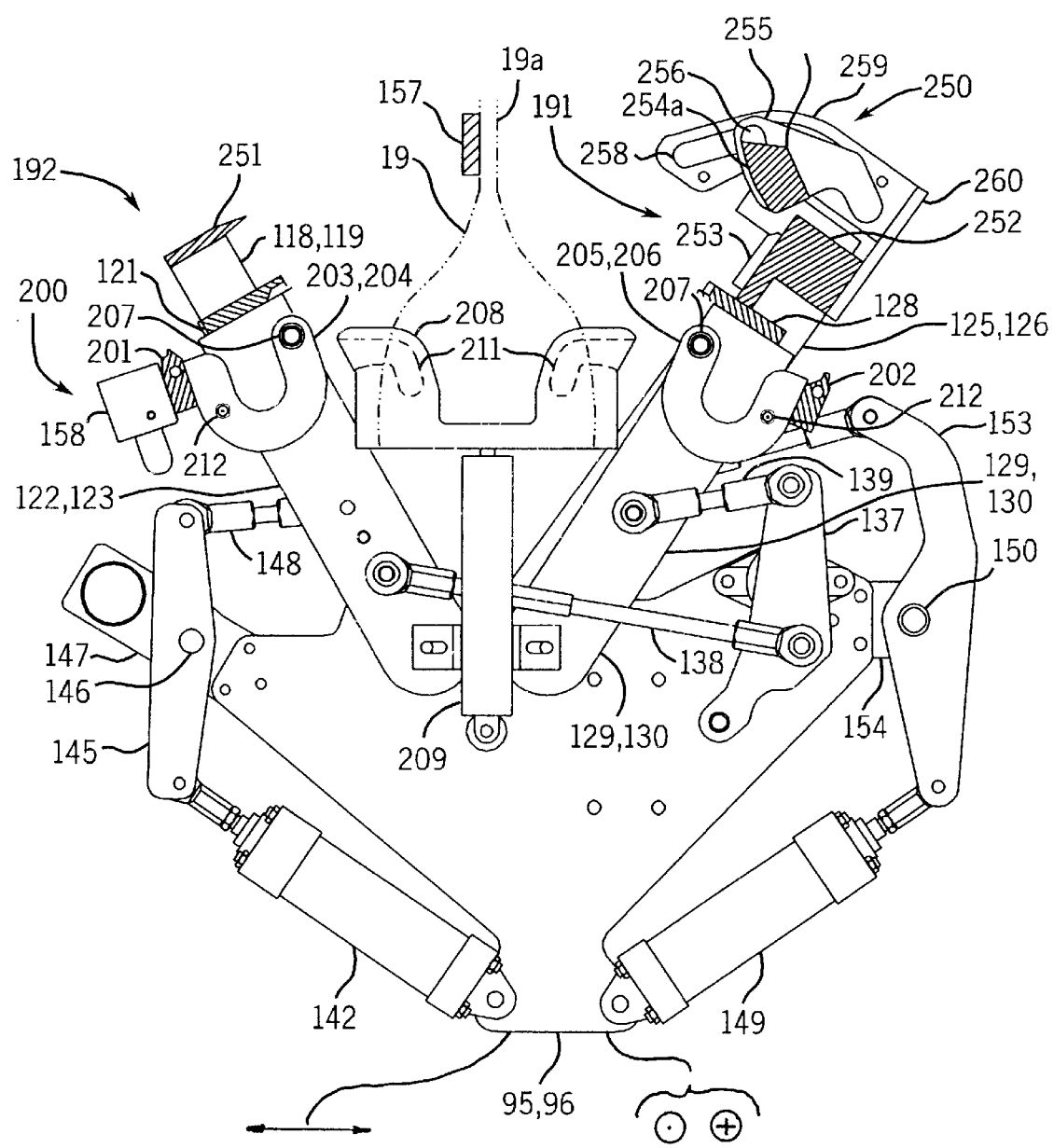
FIGS. 11–15 are cut away interior side views of the bag sealing mechanism of the preferred embodiment of the present invention; and, FIGS. 16–17 are side views of the bag sealing mechanism which illustrated more clearly the structure of the fold over mechanism secured to a crimping assembly of the preferred embodiment of the present invention.
Figure 12:
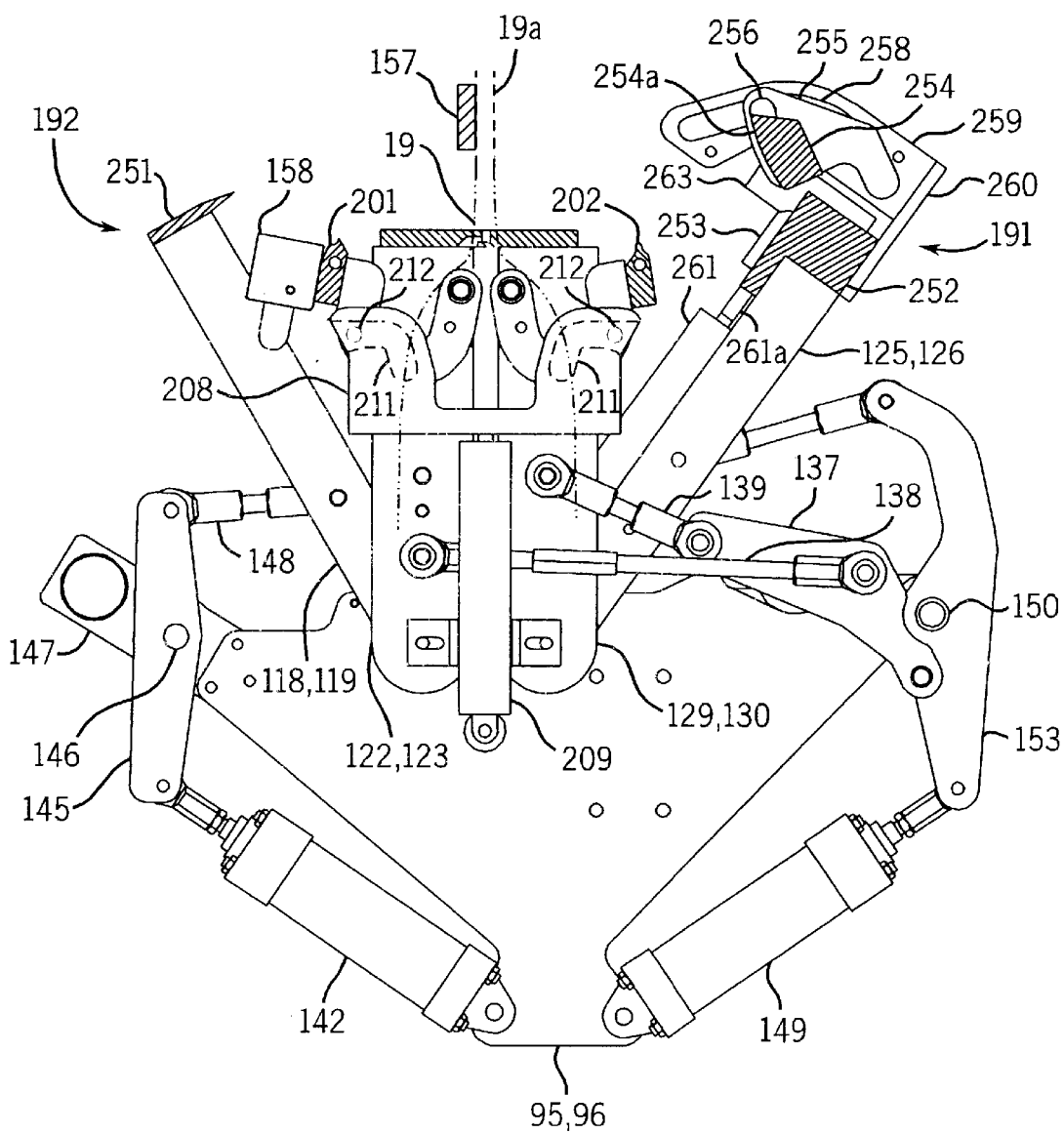

Each of the cam plates 208 have symmetric cam follower grooves 211 formed into the surfaces of the cam plates 208 that face respective side plates 95, 96. As shown in FIG. 12, the cam plates 208 are arranged such that when the cam plates 208 are in their first, lower position, and the forming bar assemblies 121,128 have been rotated to their second, closed position, cam bearings 212 on each of the arms 203–206 are received in respective cam follower grooves 211. When the forming bar assemblies 121, 128 are in their open positions, as shown in FIG. 11, cam bearings 212 are completely clear of the cam follow grooves 211 of the cam plates 208. As can be seen in FIG. 12, when the inner liner sealing bars 201, 202 are their first, inoperative position, the sealing bars 201, 202 are located below and clear of the crimping bar assemblies 191,192.

Figure 13:
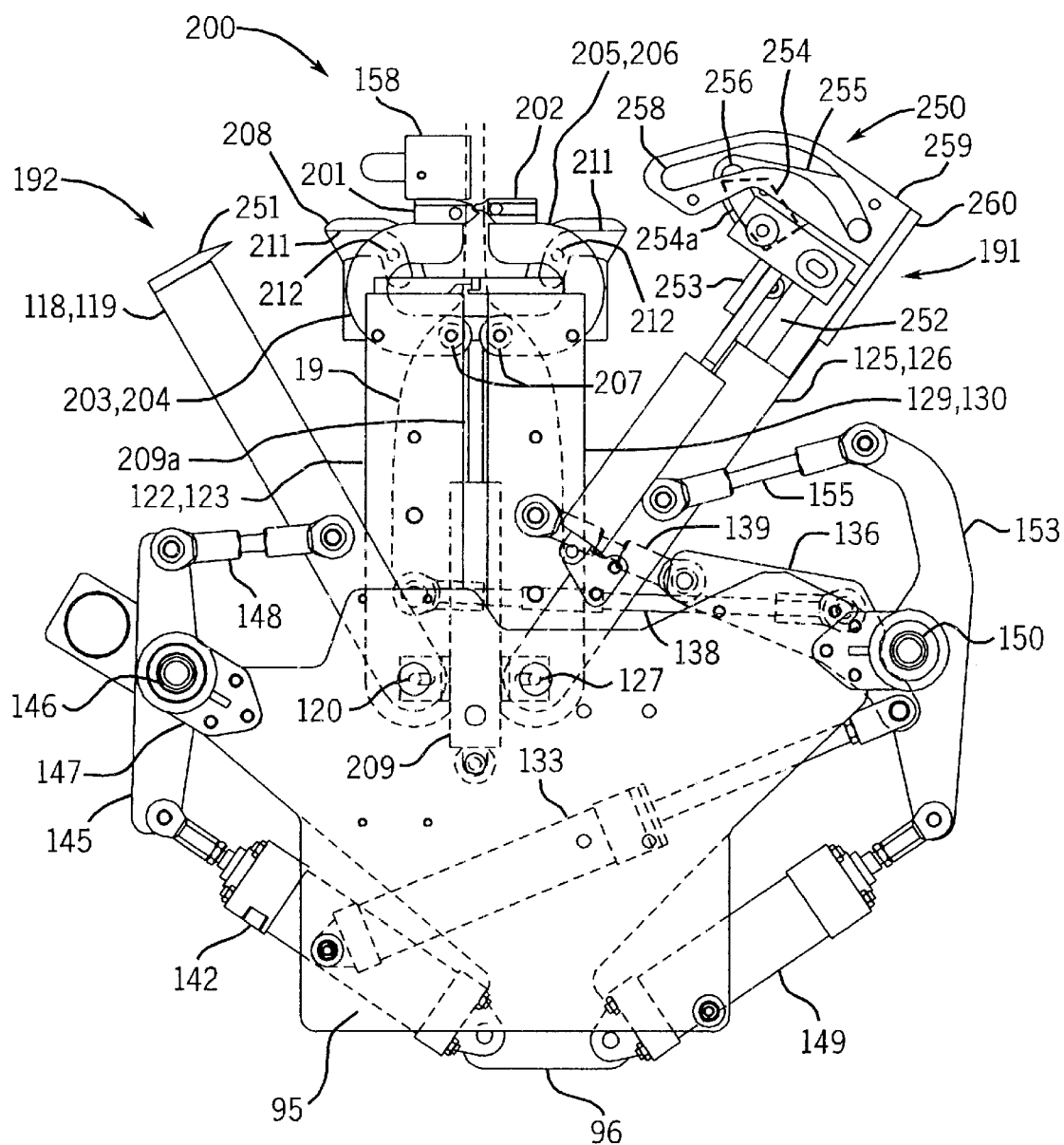
Figure 14:
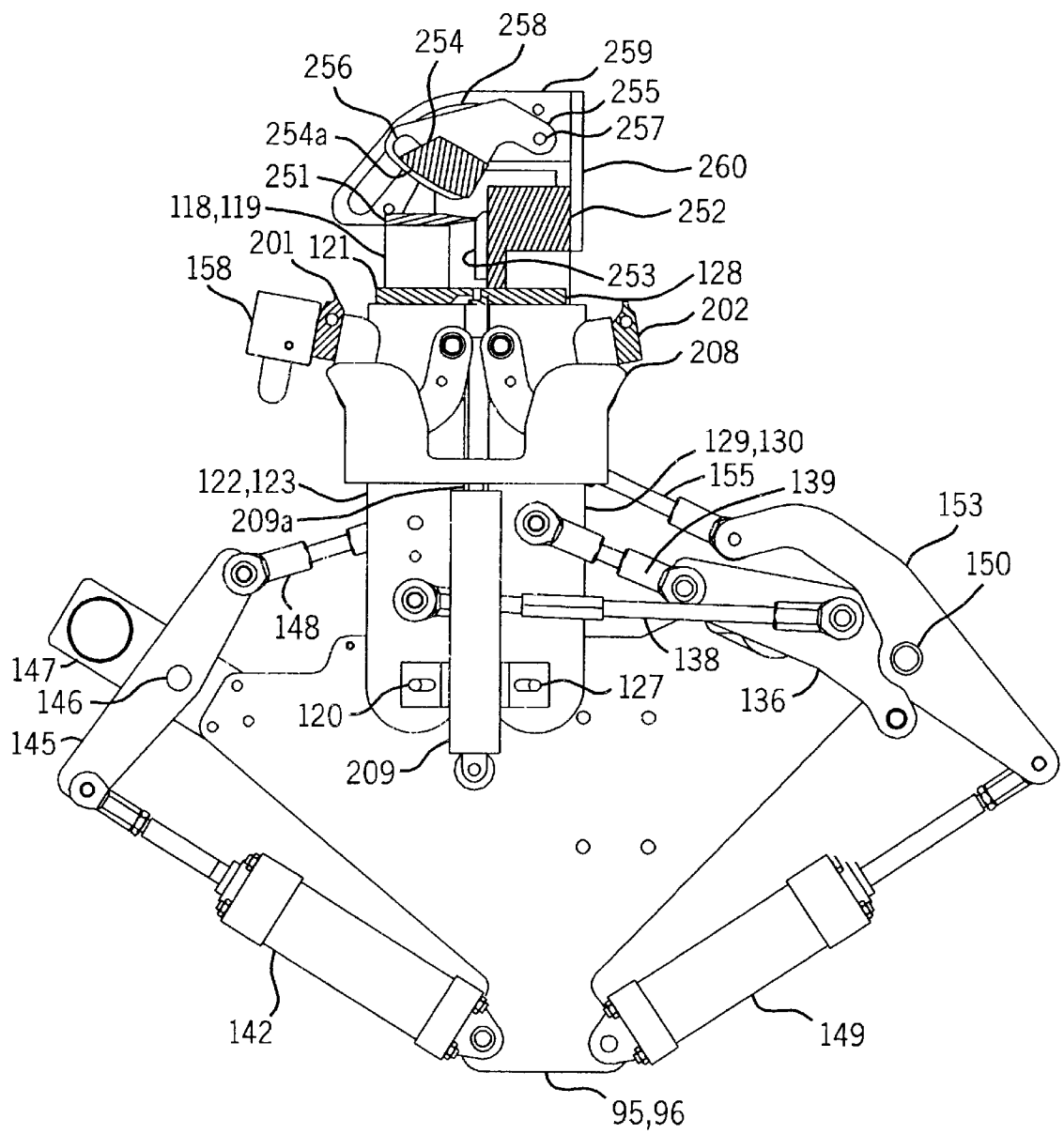

The extension of piston 209a of cylinder 209, as shown in FIG. 13, moves the cam plates 208 to their second, upper and engaged position in which the cam follower grooves 211 in the cam plates 208 engage cam bearings 212 secured to each of the inner liner sealing bar arms 203–206. As the cam plates 208 are moved upwardly by cylinders 209, the shape of the cam follower grooves 211 forces the cam bearings 212 engaged therein to move inwardly and upwardly, thereby pivoting the inner liner sealing bars 201, 202 from their first, inoperative position to their second, operative position in which the heated inner liner sealing bars 201, 202 engage the bag 19 to seal the inner liner of the bag 19. After a predetermined dwell time has passed, pistons 209a of cylinders 209 are retracted, thereby lowering the cam plates 208 to their lower positions and rotating inner liner sealing bars 201, 202 back to their first, inoperative position.

A heater manifold 158 is secured to the top of sealing bar 201. This manifold, which may be a hot air or radiant heating device, activates the adhesive 157 used to hold the folded over top flap 19a of the bag 19 closed. Activation of the adhesive 157 on the bag top 19a is accomplished simultaneously with the sealing of the inner lining of the bag 19 by inner liner sealing bars 201, 202.

The crimping assemblies 191, 192 of the preferred embodiment of the present invention comprise a pair of crimping bars 251, 252. These crimping bars 251, 252 are independently rotatively supported upon legs 118, 119 and 125, 126, respectively. The crimping bar assemblies 191, 192 are rotated between first, bag release positions and second, bag engaging positions by means of the linkages and power cylinders described above in conjunction with FIGS. 5–10. When power cylinders, 142, 149 are actuated to extend their pistons, the crimping bar assemblies 191, 192 rotate from their first, bag release positions, to their second, bag engaging positions. The face of crimping bar 251 has, in this embodiment, a knife edge that is arranged to directly oppose an elastomeric pad 253 applied to the face of the crimping bar 252. When the crimping bars 252, 252 engage the bag 19, the knife edge of crimping bar 251 forces the bag top 19a into the elastomeric pad 253 so as to form the transverse crease C in the bag top. Once the crease C has been formed in the bag top, cylinder 142 is retracted to move the crimping assembly 192 back to its first position. When the crimping assembly 192 has cleared the bag top 19a, the fold over mechanism 250 is activated to fold over and close the bag top 19a.

The fold over mechanism 250 comprises a fold over bar 254 secured between a pair of eccentric mounting plates 255. Each eccentric mounting plate 255 has a curvilinear cam slot 256 formed therein that is, in this embodiment, substantially congruent with the face of the fold over bar 254. Opposite the cam slot 256, each eccentric mounting plate 255 has extending outwardly away from the fold over bar 254 a cam bearing 257. The cam bearings 257 of each eccentric mounting plate are received and retained in respective curvilinear cam slots 258 formed in a pair of side mounting plates 259. These side mounting plates 259 extend along and outside of the eccentric mounting plates 255 and are supported from respective brackets 260 that are secured to crimping bar 252.

Figure 15:
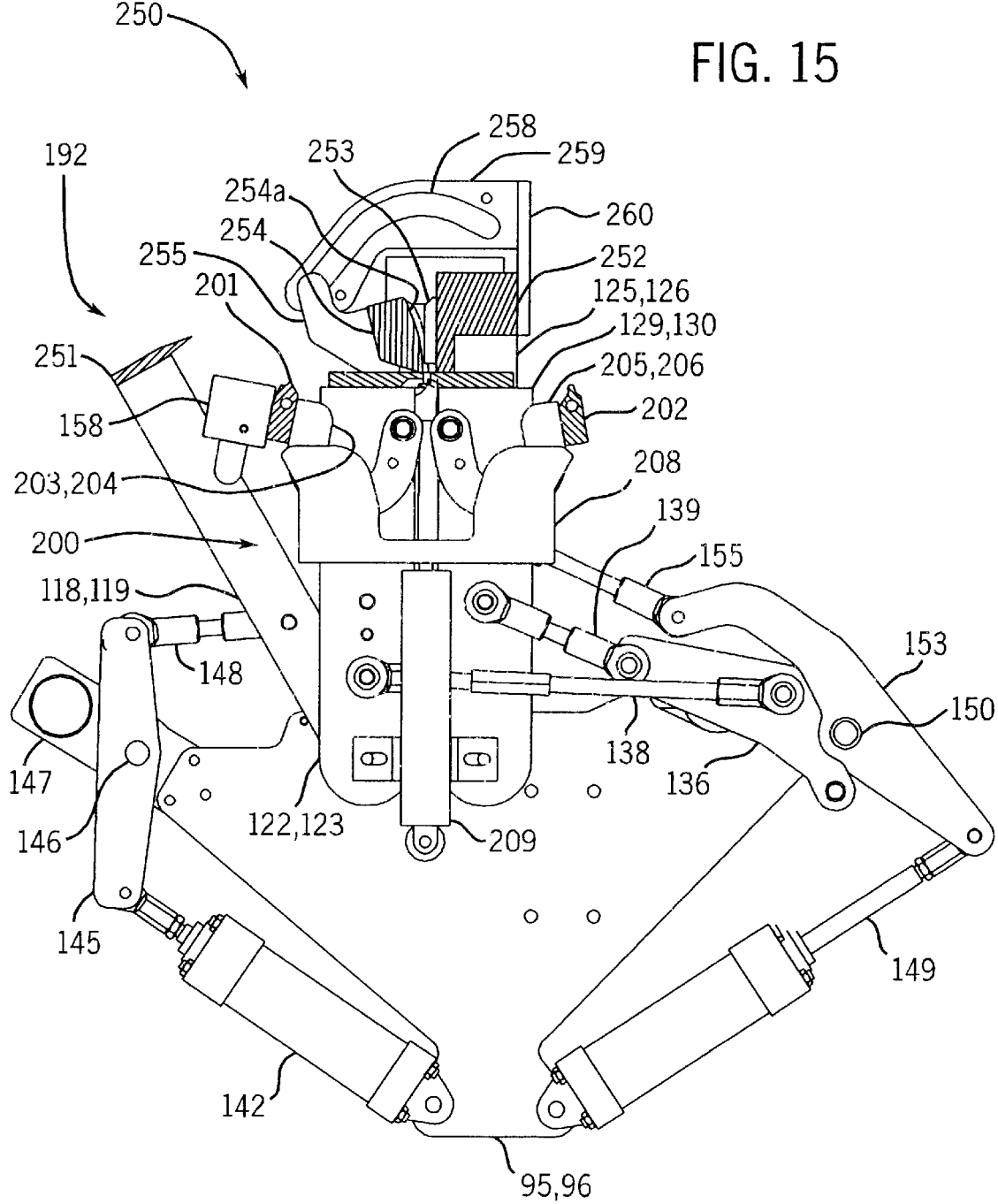
Figure 16:
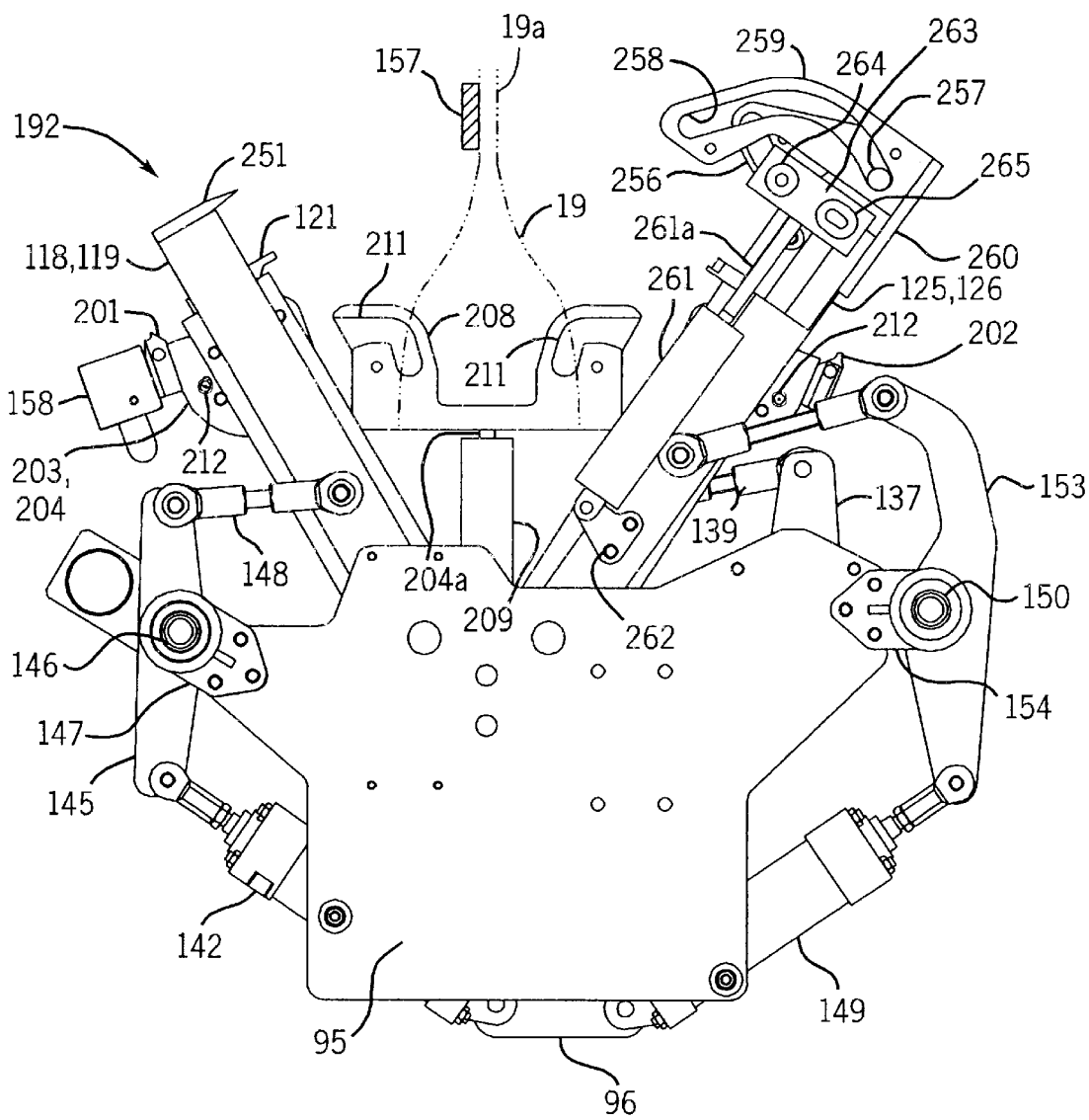
Figure 17:
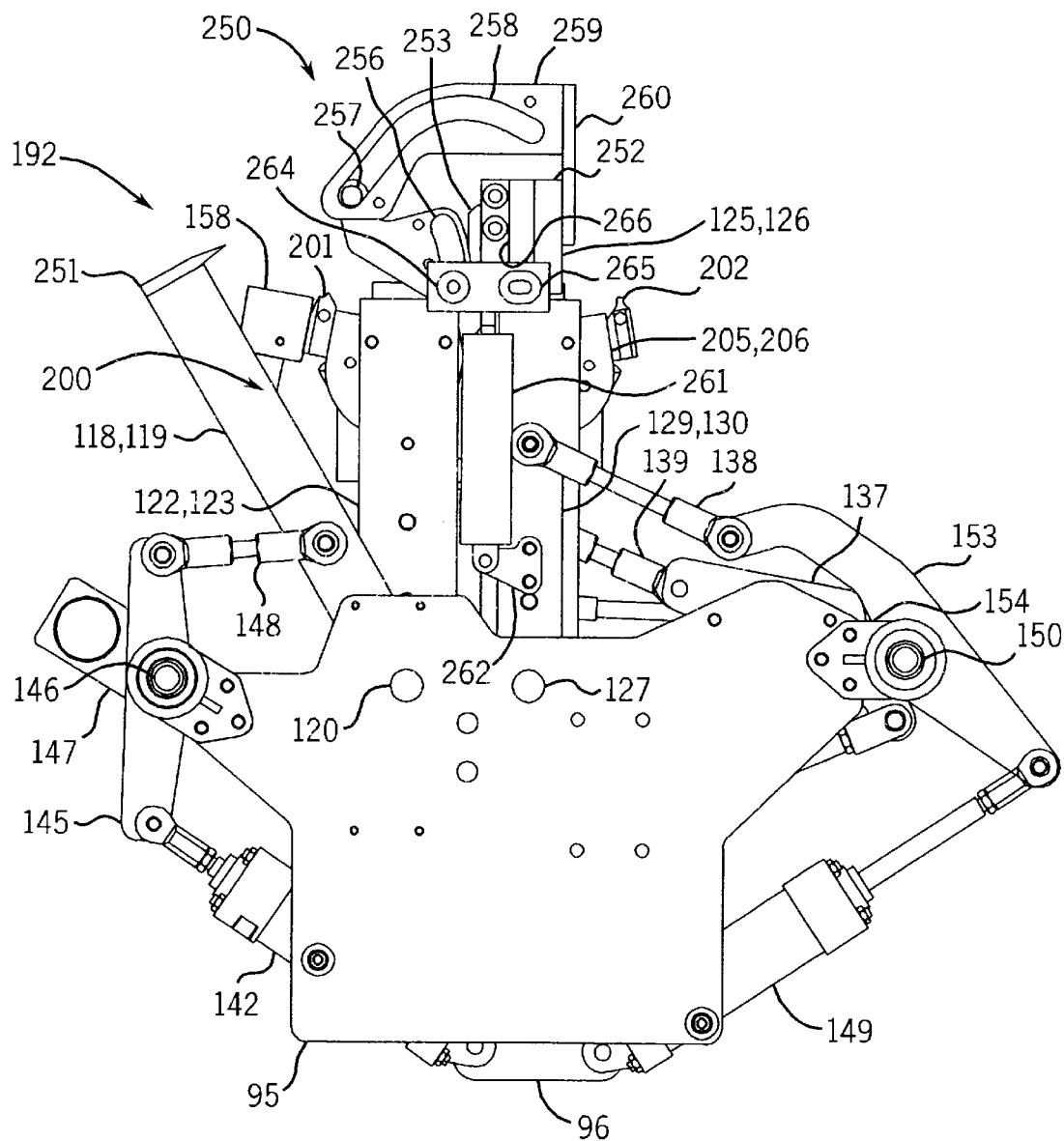

In order to achieve a uniformly and securely closed bag top, the fold over bar 254 is rotated between its first position, illustrated in FIGS. 11 and 16, and its second position, illustrated in FIGS. 15 and 17. As can be seen in FIGS. 15 and 17, the fold over bar 254 is rotated downwardly and into contact with the elastomeric pad 253 applied to the face of crimping bar 252. Rotation of the fold over bar 254 is actuated by a pair of power cylinders 261 that are secured at their bases to the outer side of legs 125, 126 by brackets 262. Rectangular plates 263 are secured to the pistons 261a of each of the cylinders 261. Each of the rectangular plates has first and second cam bearings 264, 265 secured thereto and extending inwardly toward the eccentric mounting plates 255. First cam bearing 264 is received and retained in cam slot 256 of the eccentric mounting plate 255. Second cam bearings 265 bear against projections 266 that are best seen in FIG. 17. Projections 266 extend downwardly from the crimping bar 252 along the outer surfaces of legs 125, 126. Projections 266 ensure that the rectangular plate 263 moves between their first, extended positions and second, retracted positions along a straight line. When the rectangular plates 263 are in their first, extended positions, the fold over bar 254 is in its first, open position as illustrated in FIGS. 11 and 16. And when cylinders 261 have been actuated to retract their pistons 261a, the rectangular plates are moved to their second, retracted positions and consequently rotating the fold over bar 254 into its second, closed position as illustrated in FIGS. 15 and 17. It should be noted that the cooperation between cam slot 258 and cam bearing 257 and cam slot 256 and cam bearing 264 cause the fold over bar 254 to be rotated between its first and second positions along a complex curvilinear path rather than about a single axis of rotation as does the fold over arm 141 illustrated in FIGS. 5–10. The curvilinear rotation of the fold over bar 254 moves the fold over bar 254 slightly outward beyond the crease C formed by the crimping bars 251, 252 to contact the bag top 19a slightly above the crease C. The contact between the fold over bar 254 and the bag top 19a away from the crease C gives more leverage in folding the bag top 19a into contact with the face of the bag 19. In addition, as can be most clearly seen in FIG. 15, the face of the fold over bar 254 rotates past vertical to exert sealing pressure on the folded over bag top 19a. This sealing pressure is augmented by the fact that the fold over bar 254 is compressing the folded over bag top into the elastomeric pad 253 applied to the face of the crimping bar 252. The elastomeric pad 253 acts to distribute more evenly the pressure being applied by the fold over bar 254, thereby ensuring that the heat activated adhesive 157 will secure the folded over bag top 19a to the face of the bag 19 over a larger area of the bag 19. After a predetermined dwell time as elapsed, cylinder 261 extends their pistons 261a to rotate the fold over bar 254 back to its first, open position.

The procedure for sealing a bag 19 in a bag filling operation has been described in detail in conjunction with FIGS. 5–10 and, with respect to the preferred embodiment of the present invention, this procedure differs only slightly to accommodate the newer sealing and folding mechanisms 200, 250. For instance, when the forming bar assemblies 93, 94 have securely grasped the bag 19 and after the bag sealing mechanism 190 has moved sufficiently clear of the spout 22 the servomechanism (not shown) activates cylinders 209 which extend their pistons 209a to move the cam plates 208 to their upper, engaged positions, thereby rotating inner liner sealing bars 201, 202 into their upper, operative position to seal the inner liner of the bag 19. FIG. 13. After a predetermined dwell time, the servomechanism causes cylinder 209 to retract its pistons 209a to return cam plate 208 to its lower position, thereby returning the inner liner sealing bars 201, 202 to their lower, inoperative positions. FIG. 12. Simultaneous with the sealing of the inner liner of bag 19 by the inner liner sealing bars 201, 202, heater manifold 158 is brought into close proximity to the heat activated adhesive 157 on the bag top 19a. As the inner liner sealing bars 201, 202 seal the inner liner of the bag 19, the heater manifold 158 is heating the adhesive 157 to activate it for securing the folded over bag top to the face of the bag 19.

Once the inner liner sealing bars 201, 202 have been lowered to their first, inoperative positions and the path of the crimping bar assemblies 191, 192 has been cleared, the servomechanism activates cylinders 142, 149 to rotate the crimping bar assemblies 191, 192 into contact with the bag 19, thereby forming a transverse crease C in the bag top as described above. Once the transverse crease C has been formed, the servomechanism causes cylinder 142 to retract its piston and move crimping assembly 192 back to its starting position. As soon as crimping assembly 192 has cleared the bag top, the servomechanism causes cylinders 261 to retract their pistons 261a to rotate the fold over bar 254 from its first position (illustrated in FIG. 14) to its second position (illustrated in FIG. 15) in which the fold over bar 254 forces the bag top 19a above the transverse crease C into contact with the side of the bag 19 so that the bag top 19a is adhered to the side of the bag 19. After a predetermined dwell time, cylinders 261 are again extended to move the fold over bar 254 back to its first position. At this time, the servomechanism causes cylinder 149 to retract and move crimping assembly 191 back to its first, outer position.

During this bag sealing procedure, the bag sealing mechanism 190 has continued to move downward. When bag sealing mechanism 190 reaches its lowermost, rest position as shown in FIG. 2, cylinder 133 is actuated to retract its piston 135. With this operation, forming bar assemblies 93 and 94 are swung to their open positions and a filled and sealed bag 19 is released to drop down onto conveyor 171. Successively dropped, filled bags 19 are carried away by conveyor 171 as illustrated in FIGS. 1 and 2. After a filled bag 19 has been deposited on conveyor 171, with bag sealing apparatus 190 at the bottom of its travel path as shown in FIG. 2, the bag sealing apparatus 190 is ready to move up to clamp and seal the next bag.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A bag sealing mechanism for sealing bags having an inner liner, said mechanism comprising:
   a pair of opposable forming bars for gripping and supporting said bag;
   a pair of opposable crimping bars for forming a transverse crease in said bag;
   said pairs of forming and crimping bars being rotatively supported by a pair of parallel side plates;
   said forming bars being arranged to clamp a filled bag below the location at which said pair of crimping bars form said transverse crease across said bag;
   said forming bars having rotatively mounted thereunder a pair of sealing bars, said sealing bars being arranged and constructed to rotate between a first position in which said sealing bars are clear of the path of rotation of said crimping bars and a second position in which said sealing bars engage said bag to seal said inner liner of said bag.

2. The bag sealing mechanism of claim 1 wherein said sealing bars seat said inner liner of said bag above a location at which said forming bars grip said bag.

3. The bag sealing mechanism of claim 1 wherein said sealing bars seal said inner liner of said bag at a location offset from a location at which said crimping bars form said transverse crease in said bag.

4. The bag sealing mechanism of claim 1 wherein said sealing bars are heated to seal said inner liner of said bag.

5. The bag sealing mechanism of claim 1 wherein one of said sealing bars has a heater manifold secured thereto in such a manner as to allow said heater manifold to address a portion of said bag to which a heat activated adhesive has been applied.

6. The bag sealing mechanism of claim 1 wherein one of said crimping bars has a male face and the remaining crimping bar has a female face.

7. The bag sealing mechanism of claim 6 wherein said male face of said crimping bar is a knife edge and said female face is an elastomeric pad which deforms under pressure from said knife edge of said male face of said crimping bar.

8. The bag sealing mechanism of claim 1 wherein one of said crimping bars further comprises:
- a fold-over mechanism mounted thereto, said fold-over mechanism constructed and arranged to fold a portion of a bag top over into contact with a side portion of said bag.

9. The fold-over mechanism of claim 8 further comprising:
- a fold-over bar secured above one of said crimping bars;
- said fold-over bar being constructed and arranged to rotate between a first, upper position and a second, lower position in which the fold-over bar folds a portion of said bag above said transverse crease against a portion of said bag below said transverse crease; and,
- said fold-over bar rotating between said first and second positions along a complex curvilinear path.

10. The bag sealing mechanism of claim 1 wherein said side plates by which said pairs of crimping bars and forming bars are rotatively supported are laterally movable between a first, inoperative position, in which said pairs of crimping bars and forming bars are rotated away from one another, and a second, operative position in which said pairs of crimping bars and forming bars may engage said bag top of said filled bag.

11. The bag sealing mechanism of claim 1 wherein said side plates by which said pairs of crimping bars and forming bars are rotatively supported are vertically movable between a first, inoperative position, in which said pairs of crimping bars and forming bars are rotated away from another, and a second, operative position in which said pairs of crimping bars and forming bars may engage said bag top of said filled bag.

12. A bag sealing apparatus comprising:
- a pair of opposably rotatable forming bars;
- a pair of independently actuable and opposable crimping bars arranged and constructed to form a transverse crease in a bag, at least one of said crimping bars having mounted thereto a fold-over bar, said fold-over bar capable of folding a portion of a bag top over into contact with a portion of the side of said bag,
- said pairs of forming and crimping bars being disposed between a pair of parallel mounting plates,
- said forming bars being arranged to clamp a filled bag below the location at which said pair of crimping bars form said transverse crease across said bag;
- each of said forming bars having rotatively mounted thereunder on a pair of sealing bar arms, a sealing bar, each of said sealing bars being arranged and constructed to rotate between a first position in which said sealing bars are clear of the path of rotation of said crimping bars and a second position in which said sealing bars engage said bag to seal said inner liner of said bag;
- a pair of cam plates mounted between said parallel mounting plates upon respective power cylinders, each of said cam plates having formed therein a pair of cam follower grooves arranged and constructed so that when said pair of forming bars are in position to clamp a bag therebetween, a plurality of cam bearings affixed to each of the sealing bar arms will be received in respective cam follower grooves, said cam plates having an upper and a lower position, said upper and lower positions corresponding to said first and second positions of said sealing bars, respectively.

13. A bag sealing mechanism for closing and sealing bags having an inner liner comprising:
- a pair of parallel side plates;
- a pair of crimping bar assemblies for forming a transverse crease in a bag, each comprising a crimping bar rotatively supported upon a pair of legs connected to said parallel side plates;
- a fold-over mechanism secured to one of said crimping bar assemblies for folding a portion of said bag above said crease into contact with a portion of said bag below said crease;
- a pair of forming bar assemblies for gripping and supporting a bag, each comprising a forming bar rotatively supported upon a pair of legs connected to said parallel side plates;
- a pair of sealing bar mechanisms for sealing an inner liner of said bag mounted to each of said forming bar assemblies, respectively, each of said pair of sealing bar mechanisms comprising a sealing bar rotatively mounted upon a pair of U-shaped members, each of the U-shaped members supported each of the pair of sealing bars further comprising a cam bearing, said sealing bar mechanisms are rotatable between a first, inoperatible position in which said sealing bar mechanisms are clear of a path of travel of said crimping bar assemblies, and a second, operative, position in which said sealing bar assemblies are rotated upward and inward so that said sealing bars engage said bag to seal said inner liner of said bag;
- a pair of cam plates mounted to respective parallel side plates upon respective power cylinders, said cam plates having formed therein cam follower slots, said cam follower slots being arranged such that when said forming bars are rotated inwardly to grip and support said bag, said cam follower slots in each of said cam plates will receive said cam bearings of said U-shaped members adjacent the parallel side plate to which the respective cam plates are mounted;
- said cam plates further being moveable between a first lower position and a second, upper position, said first and second positions of said cam plates corresponding to said first, inoperative position and second, operative position of said sealing bar assemblies, respectively.

* * * * *